US011902817B2

(12) United States Patent
Winter et al.

(10) Patent No.: US 11,902,817 B2
(45) Date of Patent: *Feb. 13, 2024

(54) SYSTEMS AND METHODS FOR UTILIZING MACHINE LEARNING AND NEURAL NETWORK MODELS TO IDENTIFY ISSUES IN WIRELESS NETWORKS

(71) Applicant: Verizon Patent and Licensing Inc., Basking Ridge, NJ (US)

(72) Inventors: Christian Winter, Highland Village, TX (US); Brian A. Ward, Fort Worth, TX (US); Richard S. Delk, Irmo, SC (US); Xia Li, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,434

(22) Filed: Oct. 6, 2022

(65) Prior Publication Data
US 2023/0088342 A1    Mar. 23, 2023

Related U.S. Application Data

(63) Continuation of application No. 16/691,400, filed on Nov. 21, 2019, now Pat. No. 11,477,678.

(51) Int. Cl.
*H04W 24/10* (2009.01)
*H04B 17/345* (2015.01)
*G06N 3/04* (2023.01)
*G06N 3/08* (2023.01)

(52) U.S. Cl.
CPC .............. *H04W 24/10* (2013.01); *G06N 3/04* (2013.01); *G06N 3/08* (2013.01); *H04B 17/345* (2015.01)

(58) Field of Classification Search
CPC .... H04W 24/10; H04W 24/04; H04B 17/345; G06N 3/08; G06N 3/0454; G06N 3/04; G06N 20/10
See application file for complete search history.

(56) References Cited

U.S. PATENT DOCUMENTS

| | | |
|---|---|---|
| 10,423,403 B1 | 9/2019 | Natarajan et al. |
| 2015/0379429 A1 | 12/2015 | Lee et al. |
| 2018/0019910 A1 | 1/2018 | Tsagkaris et al. |
| 2019/0095801 A1 | 3/2019 | Saillet et al. |
| 2020/0007249 A1 | 1/2020 | Derr et al. |
| 2020/0050949 A1 | 2/2020 | Sundararaman et al. |
| 2020/0136898 A1 | 4/2020 | Patel et al. |
| 2020/0380335 A1 | 12/2020 | Neznal |

(Continued)

*Primary Examiner* — Chi Ho A Lee

(57) ABSTRACT

A device may receive input data associated with a wireless network, and may extract data from the input data to generate extracted data. The device may create PRB images based on the extracted data, and may process the PRB images, with a first model, to associate labels with each of the PRB images. The device may process the labels and the PRB images, with a second model, to identify potential issues associated with the PRB images, and may process data identifying the potential issues associated with the PRB images, with a third model, to compress the data identifying the potential issues into an array. The device may process the array, with a fourth model, to determine probability scores associated with the potential issues, and may select a potential issue with a greatest probability score as a detected issue. The device may perform actions based on the detected issue.

20 Claims, 15 Drawing Sheets

100

120
Receive input data that includes time and date data, branch identification data, and interference per physical resource block (PRB) number data User devices 105 eNB 110

Analysis platform 115

(56) References Cited

U.S. PATENT DOCUMENTS

| | | |
|---|---|---|
| 2021/0182709 A1 | 6/2021 | Manchanda et al. |
| 2021/0216907 A1 | 7/2021 | Husain et al. |
| 2022/0188660 A1 | 6/2022 | Schoenharl et al. |

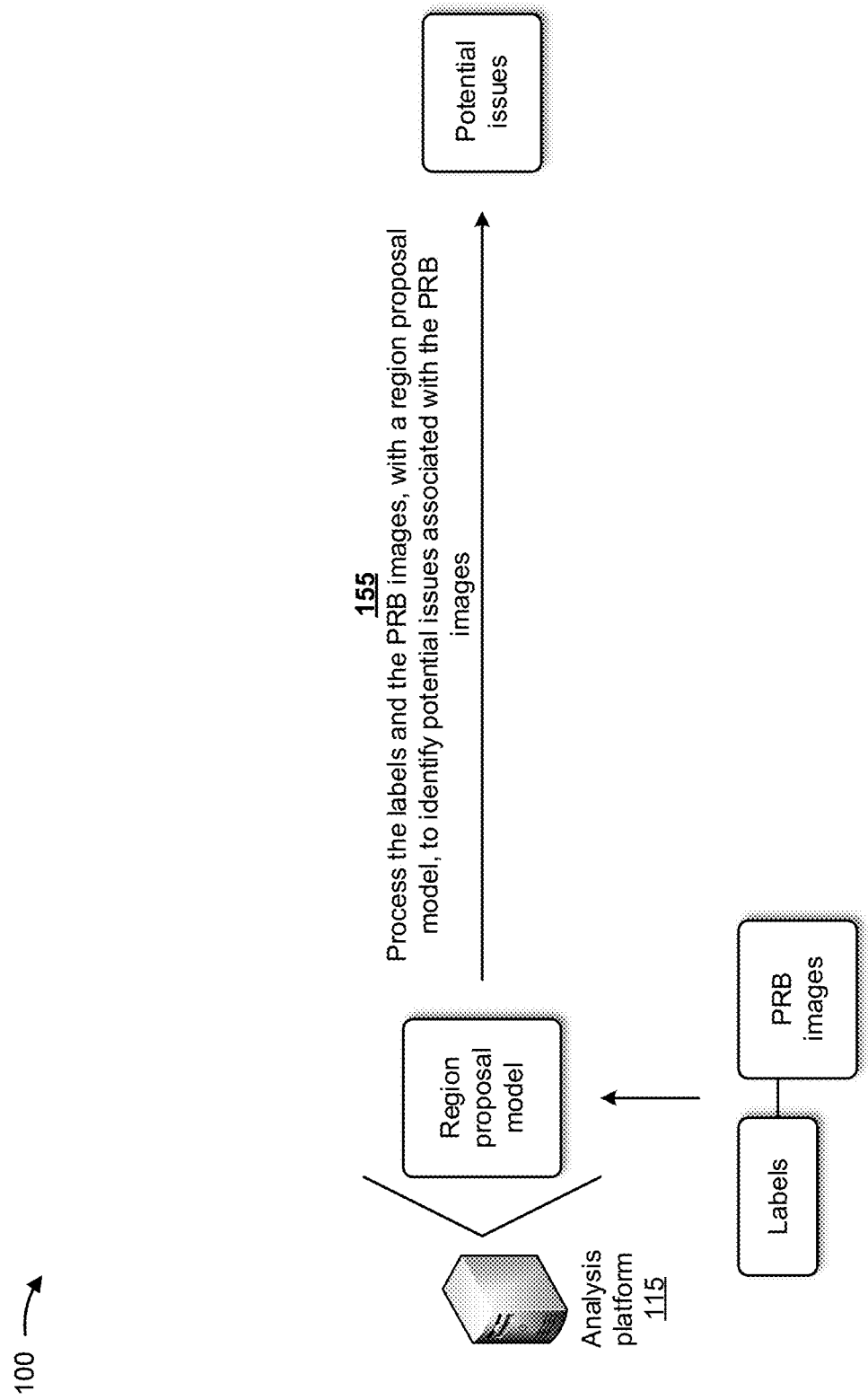

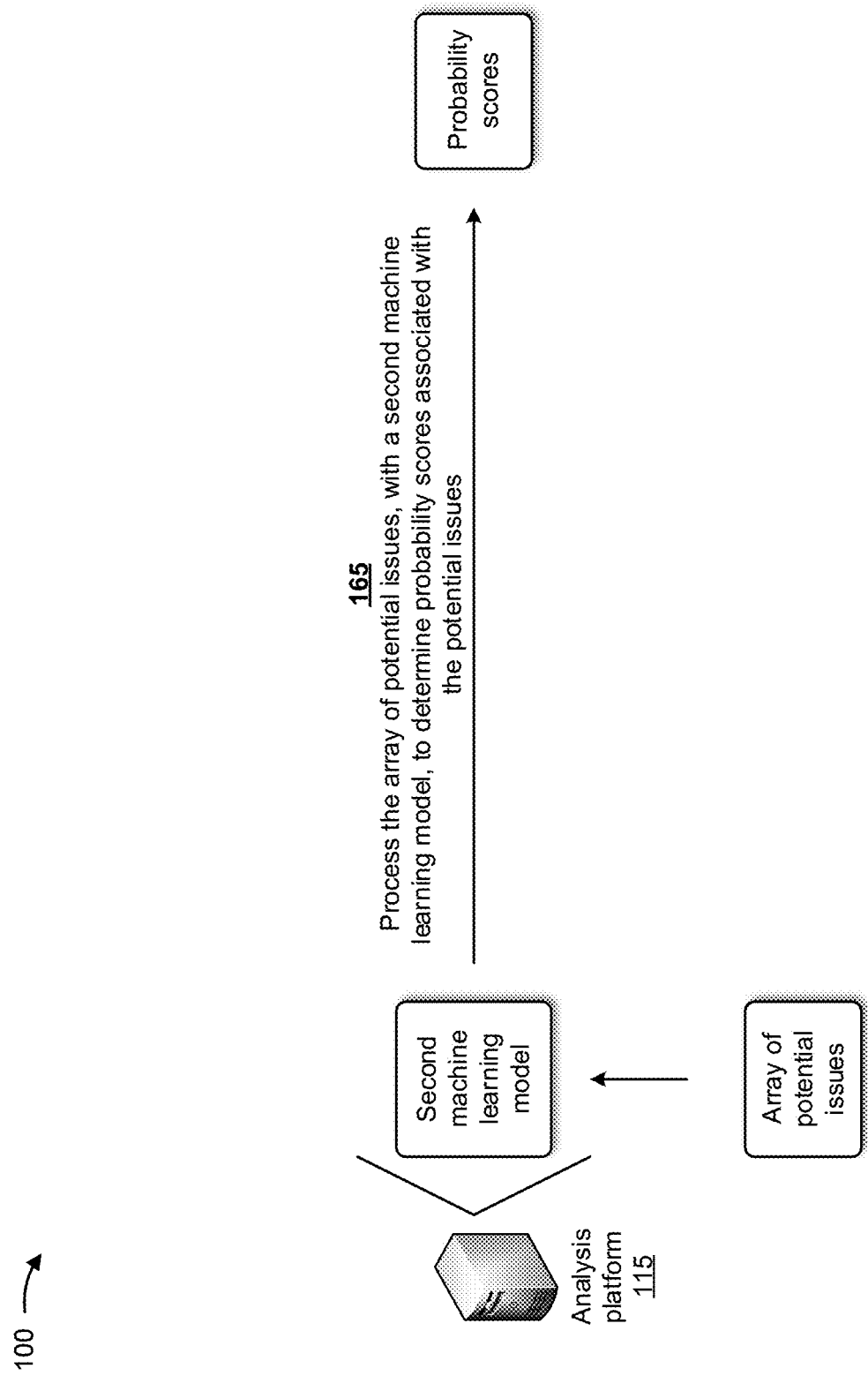

SYSTEMS AND METHODS FOR UTILIZING MACHINE LEARNING AND NEURAL NETWORK MODELS TO IDENTIFY ISSUES IN WIRELESS NETWORKS

RELATED APPLICATION

This application is a continuation of U.S. patent application Ser. No. 16/691,400, entitled "SYSTEMS AND METHODS FOR UTILIZING MACHINE LEARNING AND NEURAL NETWORK MODELS TO IDENTIFY ISSUES IN WIRELESS NETWORKS," filed Nov. 21, 2019 (now U.S. Pat. No. 11,477,678), which is incorporated herein by reference in its entirety.

BACKGROUND

System performance engineers troubleshoot issues with wireless networks, such as radio access networks (RANs). One responsibility of the system performance engineers is to identify and resolve issues that negatively impact the customer experience.

BRIEF DESCRIPTION OF THE DRAWINGS

FIGS. 1A-1L are diagrams of one or more example implementations described herein.

DETAILED DESCRIPTION OF PREFERRED EMBODIMENTS

Figure 1A:
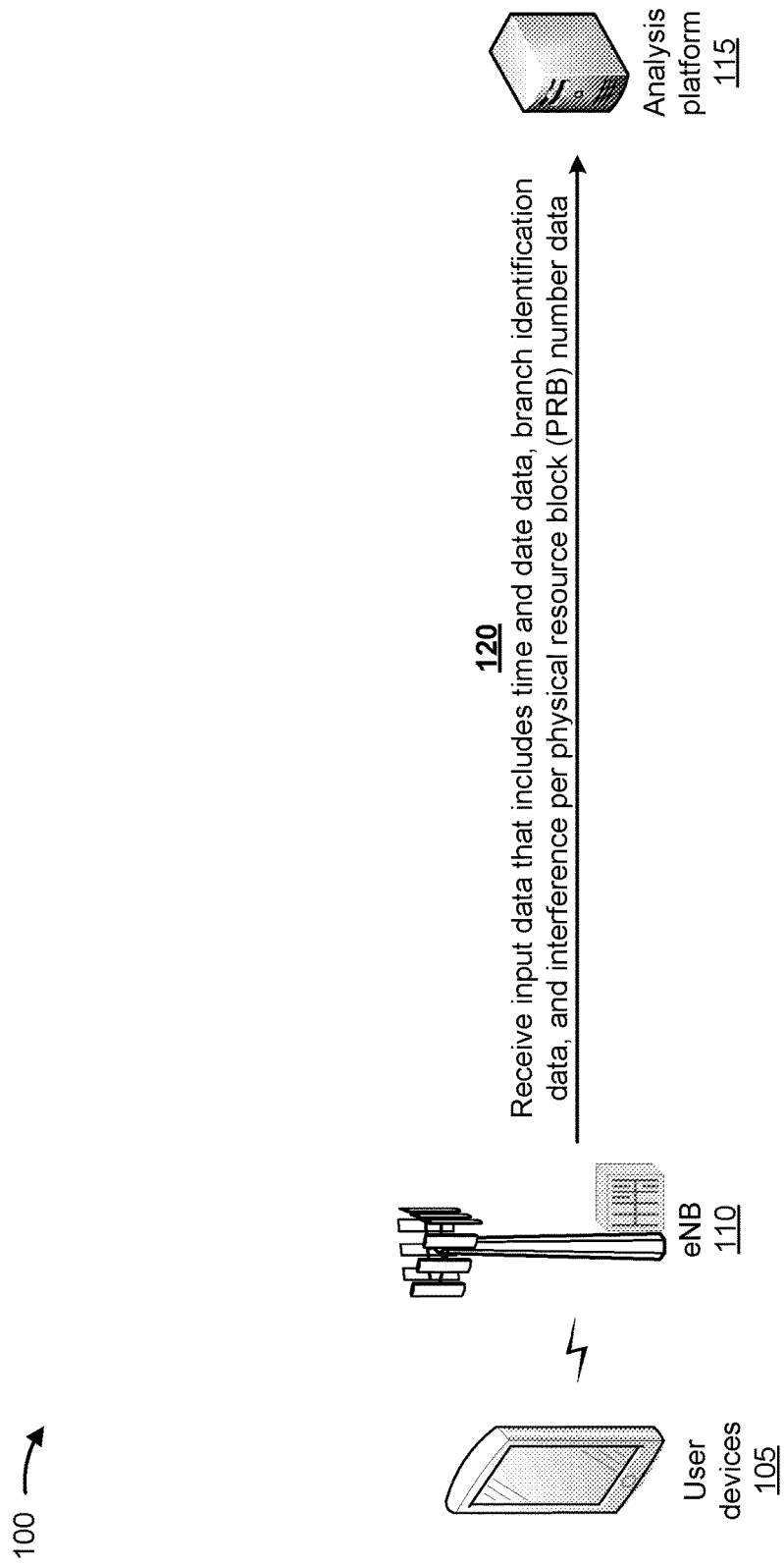

The following detailed description of example implementations refers to the accompanying drawings. The same reference numbers in different drawings may identify the same or similar elements.

Currently, system performance engineers review images of wireless network interference measurements and attempt to identify interference signatures from the images. Unfortunately, a quantity of the images is too large to analyze at scale and makes identification of interference signatures difficult (e.g., due to a network include hundreds of thousands sector carriers yielding the images). In a fourth generation (4G) long term evolution (LTE) wireless network, a system performance engineer may visually inspect a distribution of interference across physical resource blocks (PRBs) over a time period across each radio frequency (RF) branch (e.g., a physical link between a port on a transmit/receive antenna and a transmit/receive port on an eNodeB (eNB) radio). A quantity of ports on the antenna and the radio is typically two or more. In 4G LTE networks, the eNB regularly measures the interference per RF branch and PRB to calculate an average for each time interval and PRB. The result is reported in an eNB counter displayed as an image to the system performance engineer (e.g., on a per RF branch, per PRB basis). The image presented to the engineer may include all PRBs (e.g., up to one-hundred) present over a time period (e.g., up to one-hundred counters, aggregated hourly, may make up a single image). Using the image, the system performance engineer identifies areas where measured interference exceeds certain thresholds (e.g., typically −110 decibel-milliwatts (dBm)) and indicates presence of a possible issue. The system performance engineer then determines which RF branches are affected by the interference, how wide the interference is in frequency, when the interference occurs during a day, whether the interference is cyclical, and/or the like. The system performance engineer uses this information to categorize the interference, which helps determine whether a site visit and repair is necessary or whether an external interference source is causing the issue.

Current techniques for troubleshooting issues with wireless networks require the software performance engineer to utilize various computing resources (e.g., processing resources, memory resources, communication resources, and/or the like), networking resources, and/or the like to retrieve, manipulate, and an analyze interference information associated with the wireless networks. Thus, current techniques for troubleshooting issues with wireless networks waste resources (e.g., computing resources, networking resources, and/or the like) associated with retrieving the interference information, manipulating the interference information, analyzing the interference information, correcting any incorrect interpretations of the interference information, and/or the like. Furthermore, the current techniques waste staffing resources, are expensive, and are cumbersome and time consuming.

Some implementations described herein provide an analysis platform for utilizing machine learning and neural network models to identify issues in wireless networks. For example, the analysis platform may receive input data that includes time and date data, branch identification data, and interference per physical resource block number data associated with a wireless network, and may process the input data, with a data cleansing technique, to generate clean data. The analysis platform may extract data from the clean data to generate extracted data identifying a quantity of radio frequency branches and data identifying a bandwidth, and may create physical resource block images based on the extracted data. The analysis platform may process the physical resource block images, with a first machine learning model, to associate labels with each of the physical resource block images, and may process the labels and the physical resource block images, with a region proposal model, to identify potential issues associated with the physical resource block images. The analysis platform may process data identifying the potential issues associated with the physical resource block images, with a neural network model, to compress the data identifying the potential issues into an array of potential issues, and may process the array of potential issues, with a second machine learning model, to determine probability scores associated with the potential issues. The analysis platform may select a potential issue with a greatest probability score as a detected issue associated with the wireless network, and may perform one or more actions based on the detected issue.

In this way, the analysis platform utilizes machine learning and neural network models to identify issues in wireless networks. The analysis platform may successfully diagnose different types of issues, such as narrow band interference, wide band interference, passive intermodulation (PIM), radio failure, and/or the like. The analysis platform significantly reduces the time and expertise required to identify and troubleshoot such issues, reduces visits to wireless network sites, and increases efficiency. Thus, the analysis platform conserves computing resources, networking resources, transportation resources, and/or the like that would otherwise be wasted in retrieving the interference information, manipulating the interference information, analyzing the interference information, correcting any incorrect interpretations of the interference information, traveling to wireless network sites, and/or the like.

FIGS. 1A-1L are diagrams of one or more example implementations 100 described herein. As shown in FIG. 1A, user devices 105 may be associated with a network device (e.g., an eNB 110 of a wireless network (e.g., radio access network (RAN)) and an analysis platform 115. User devices 105 may include mobile devices, computers, telephones, set-top boxes, and/or the like that the users may utilize to interact with and/or retrieve information from eNB 110. Analysis platform 115 may include a platform that utilizes machine learning and neural network models to identify issues in wireless networks, such as the RAN associated with eNB 110.

As further shown in FIG. 1A, and by reference number 120, analysis platform 115 may receive, from eNB 110, input data that includes time and date data, branch identification data, interference per physical resource block (PRB) number data, and/or the like. In some implementations, the date and time data may include a numeric date (e.g., a day, a month, and a year) and a numeric hour (e.g., from zero to twenty-three hours) associated with each data point of the branch identification data and the interference per PRB number data. The terms "branch" or "branches," as used herein, may refer to radio frequency branch or radio frequency branches. The branch identification data may include data identifying a network device (e.g., eNB 110), a radio port, an antenna port (e.g., an RF branch), and/or the like. The interference per PRB number data may include data identifying average RF interference received at the radio port of eNB 110, references to specific PRBs (e.g., labeled one through one-hundred), and/or the like. The interference per PRB number data may be provided in dBm (e.g., in decibels above or below an interference measured in reference to one milliwatt). In some implementations, the input data may include data identifying dates (e.g., using format MM/DD/YYYY), hours (e.g., from zero to twenty-three hours), a name mobility management entity (MME) pool associated with eNB 110, a name of a geographic region in which eNB 110 is located, a numeric identifier of a market in which eNB 110 is located, a name of the market in which eNB 110 is located, a name of eNB 110, a numeric identifier of eNB 110, a numeric identifier of a relative cell associated with eNB 110, a numeric identifier of a radio branch associated with eNB 110, measured interference determined for multiple PRBs (e.g., one-hundred PRBs), and/or the like.

In some implementations, analysis platform 115 may continuously receive the input data, may periodically receive the input data, may receive the input data upon request from eNB 110, and/or the like. In some implementations, analysis platform 115 may store the input in a data structure (e.g., a database, a table, a list, and/or the like) associated with analysis platform 115.

Figure 1B:
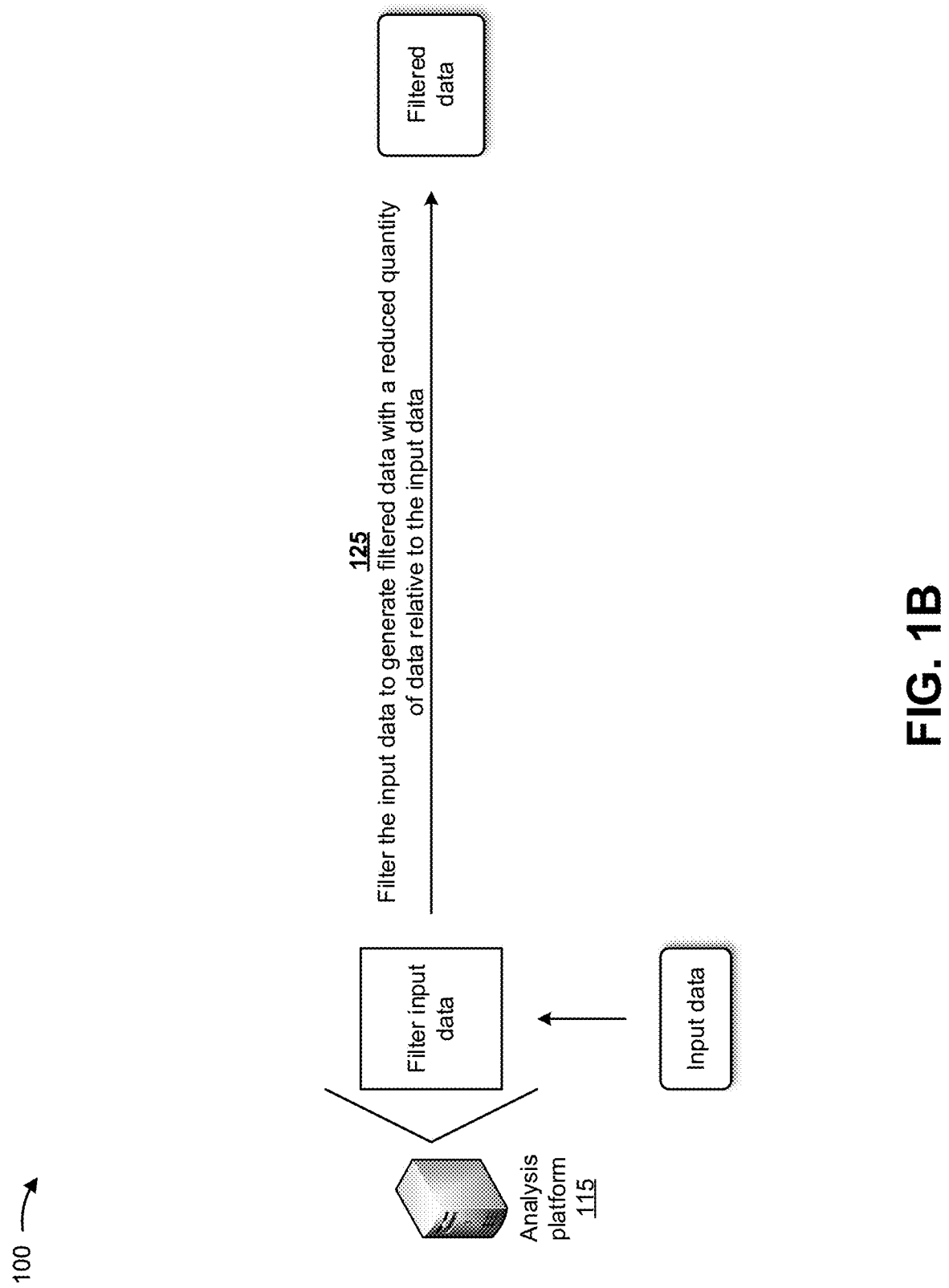

As shown in FIG. 1B, and by reference number 125, analysis platform 115 may filter the input data to generate filtered data with a reduced quantity of data relative to the input data. In some implementations, the input data may be utilized to train one or more models described herein and to execute the one or more models to detect and classify interference. In some implementations, analysis platform 115 may be associated with thousands, tens of thousands, hundreds of thousands of eNBs 110, and each eNB 110 may include one or more RF branches (e.g., four, eight, or per use of the network configuration). The one or more models may require a quantity of days of data (e.g., fourteen days). Thus, a size of the input data may exceed hundreds of millions of rows of data. Due to the large size of the input data, analysis platform 115 may utilize a filter (e.g., when executing one or more trained models) to limit a quantity of rows of the input data extracted from the data structure associated with analysis platform 115. In some implementations, the filter may identify one or more sector-carriers that are likely to have interference issues. Based on identifying the one or more sector-carriers that are likely to have interference issues, the input data may be filtered to only include those eNBs 110 where interference issues are likely to be present. This may remove a majority of rows from the input data, and may allow timely execution of the one or more models on a daily basis.

In some implementations, if the input data is received from a single eNB 110 (e.g., as shown in FIG. 1B) or from a few eNBs 110, analysis platform 115 may receive much less input data. In such implementations, analysis platform 115 may not need to filter the input data, and may utilize all of the input data to train the one or more models and to execute the one or more models to detect and classify interference.

Figure 1C:
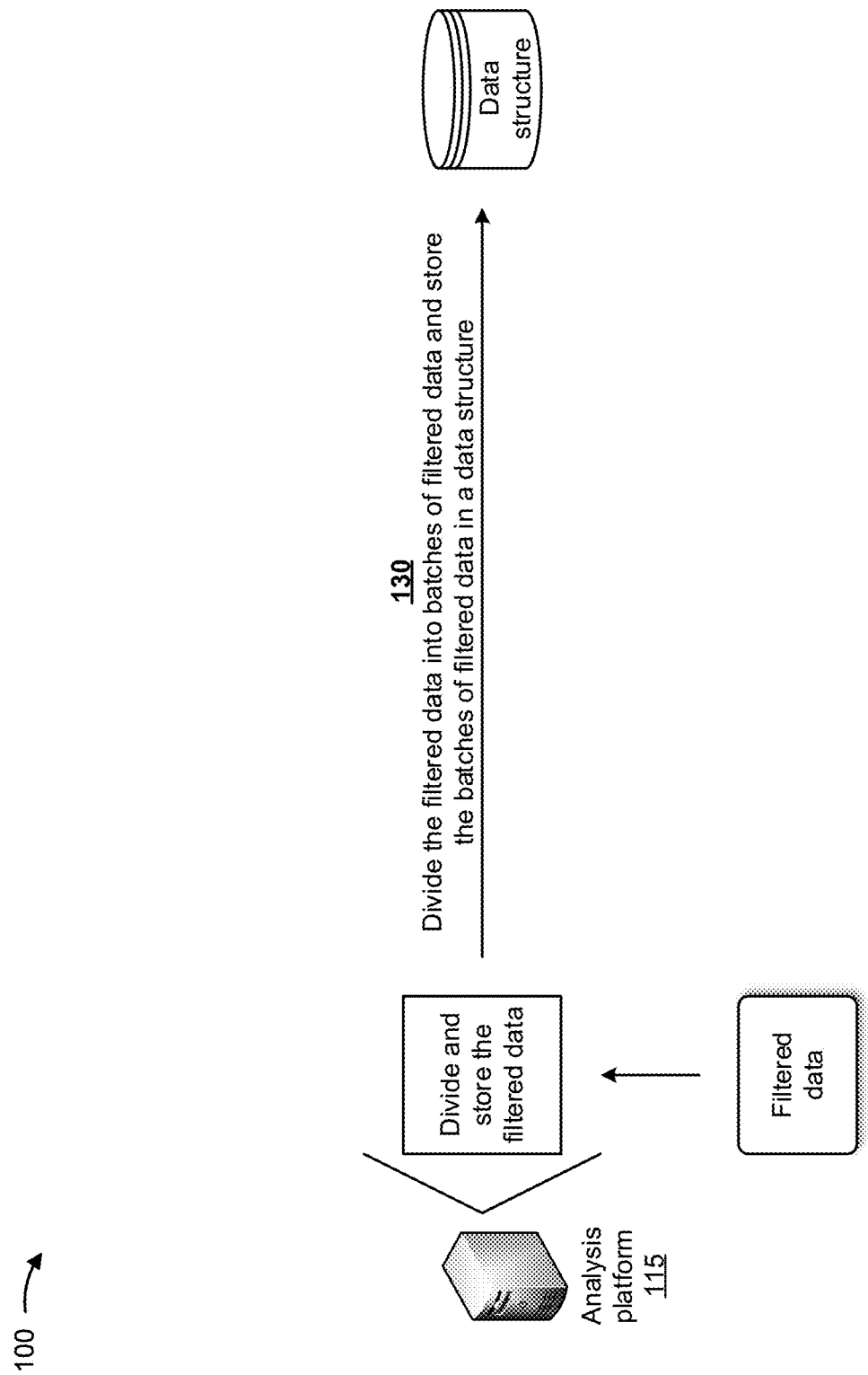

As shown in FIG. 1C, and by reference number 130, analysis platform 115 may divide the filtered data into batches of filtered data, and may store the batches of filtered data in the data structure associated with analysis platform 115. If the input data or the filtered data exceeds hundreds of millions of rows of data, a single file storing the input data or the filtered data may require a large memory size (e.g., ten gigabytes, twenty gigabytes, and/or the like), and utilizing the input data or the filtered data to train and/or execute the one or more models may require significant memory resources (e.g., random-access memory (RAM) resources). If subsequent processing of the input data or the filtered data halts due to memory overflow, analysis platform 115 may need to restart processing of the input data or the filtered data, no matter how close processing is to completion. To minimize restart of the processing of the input data or the filtered data, analysis platform 115 may divide the input data or the filtered data into separate files or batches. Thus, analysis platform 115 may process only one batch of the input data or the filtered data at a time, and, if errors or a memory overflow occur, analysis platform 115 need only to recompute the one batch of the input data or the filtered data again, rather than an entirety of the input data or the filtered data. Furthermore, dividing the input data or the filtered data into batches may conserve computing resources (e.g., processing resources, memory resources, communication resources) since the batches may parallel processed by multiple computing resources, which may greatly reduce computing time.

Figure 1D:
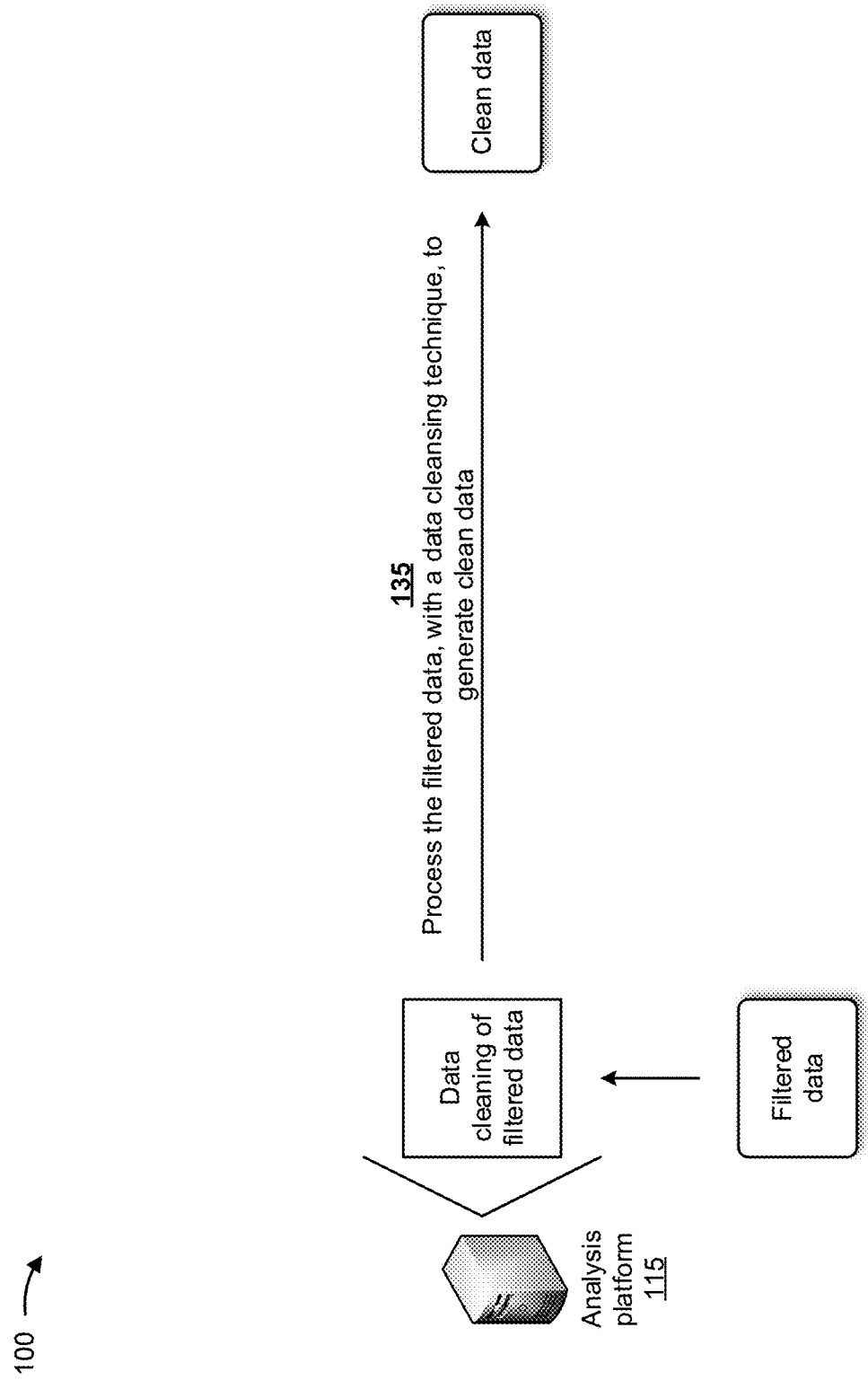

As shown in FIG. 1D, and by reference number 135, analysis platform 115 may process the filtered data, with a data cleansing technique, to generate clean data. In some implementations, when processing the filtered data, with the data cleansing technique, analysis platform 115 may remove duplicate data from the filtered data, may convert incorrectly formatted data of the filtered data into correct data formats, may combine the date and time data, and/or the like, to generate the clean data.

In some implementations, the data cleansing technique may detect and correct (or remove) corrupt or inaccurate data in the filtered data, and may replace, modify, or delete the corrupt or inaccurate data. The data cleansing technique may detect and correct inconsistencies in the filtered data caused by corruption in transmission or storage, caused by utilization of different definitions for similar data in different data structures, and/or the like. The data cleansing technique may remove typographical errors from the filtered data or may validate and correct values against a known list of values. The data cleansing technique may clean the filtered data by cross checking the filtered data with a validated data set, standardizing the filtered data by changing a reference data set to a new standard, and/or the like. Additionally, the data cleansing technique may include data enhancement, where the filtered data is made more complete by adding related information to the filtered data.

Figure 1E:
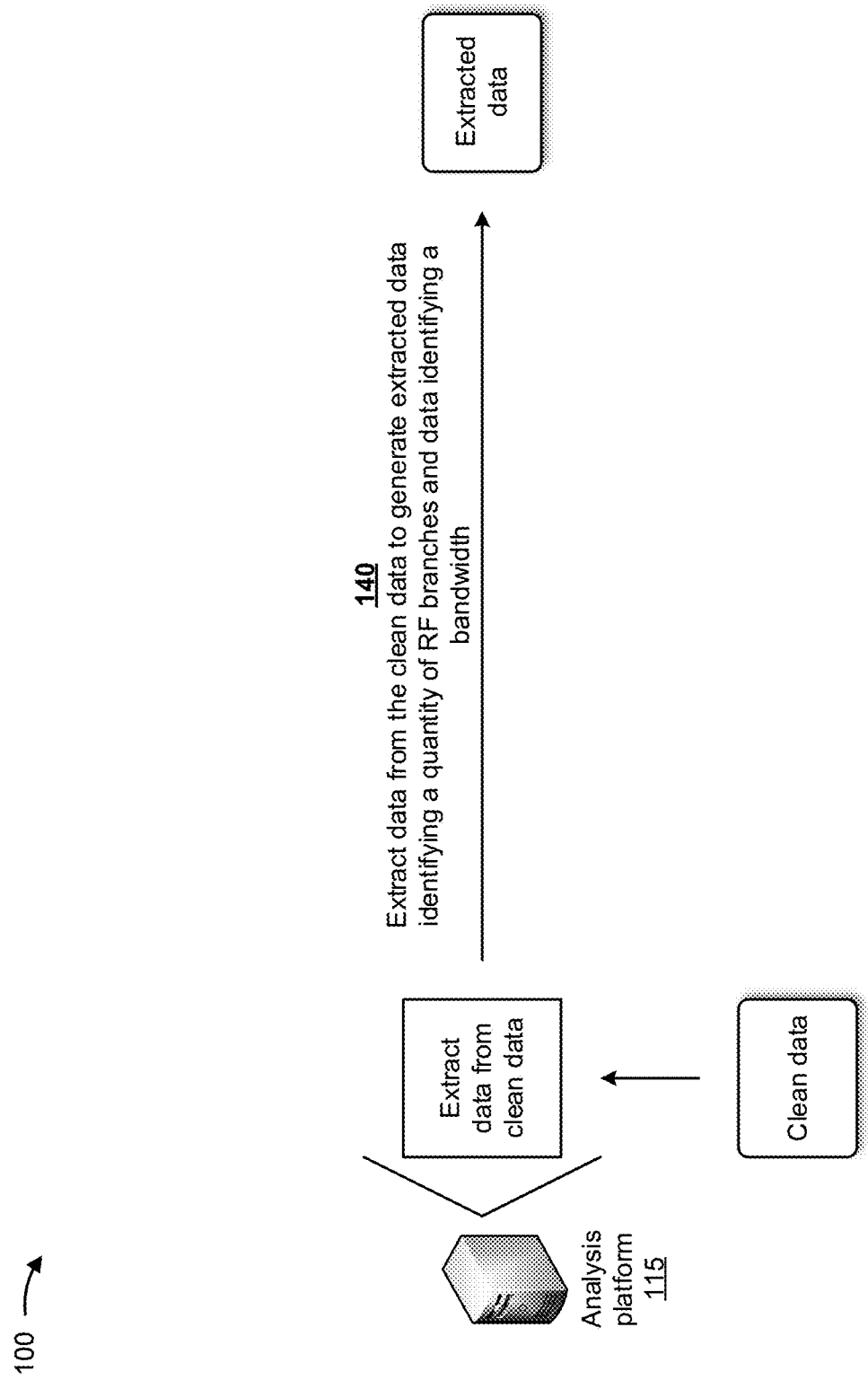

As shown in FIG. 1E, and by reference number 140, analysis platform 115 may extract data from the clean data to generate extracted data identifying a quantity of RF branches associated with eNB 110 and data identifying a bandwidth associated with eNB 110. In some implementations, the bandwidth may be utilized to control a height (e.g., a y-axis) of each RF branch in an interference image (e.g., described below) and the quantity of RF branches may determine a quantity of panels in the interference image. Each panel representing an RF branch may be separated by a horizontal line to stitch together a complete image of all RF branches for eNB 110.

For example, if eNB 110 includes a bandwidth of twenty-five PRBs, the interference values for other PRBs (e.g., PRBs twenty-six to one-hundred) may be zero. In this example, there may be four different bandwidths used in RANs (e.g., twenty-five, fifty, seventy-five, and one-hundred PRBs). By counting the zeros, analysis platform 115 may determine a bandwidth for eNB 110 according to the following rule:

$$\text{Bandwidth} = \begin{cases} 25 & \text{if count of nonzero } PRBs \leq 25 \\ 50 & \text{if count of nonzero } PRBs \leq 50 \text{ (and } > 25) \\ 75 & \text{if count of nonzero } PRBs \leq 75 \text{ (and } > 50) \\ 100 & \text{if count of nonzero } PRBs \leq 100 \text{ (and } > 75) \end{cases}$$

After determining the bandwidth of eNB 110, analysis platform 115 may identify the quantity of RF branches for eNB 110. In some implementations, the clean data may include data (e.g., a column) identifying quantities of RF branches. By identifying a maximum quantity included in that column for eNB 110, analysis platform 115 may identify the quantity of RF branches for eNB 110. The following table provides an example of the extracted data.

| eNB Identifier | Sector | Carrier | RF Branches | Bandwidth |
|---|---|---|---|---|
| 36117 | 3 | 1 | 4 | 50 |
| 36057 | 1 | 1 | 2 | 50 |
| 36006 | 4 | 1 | 4 | 50 |
| 35690 | 2 | 1 | 4 | 50 |
| 35541 | 2 | 1 | 4 | 50 |

Figure 1F:
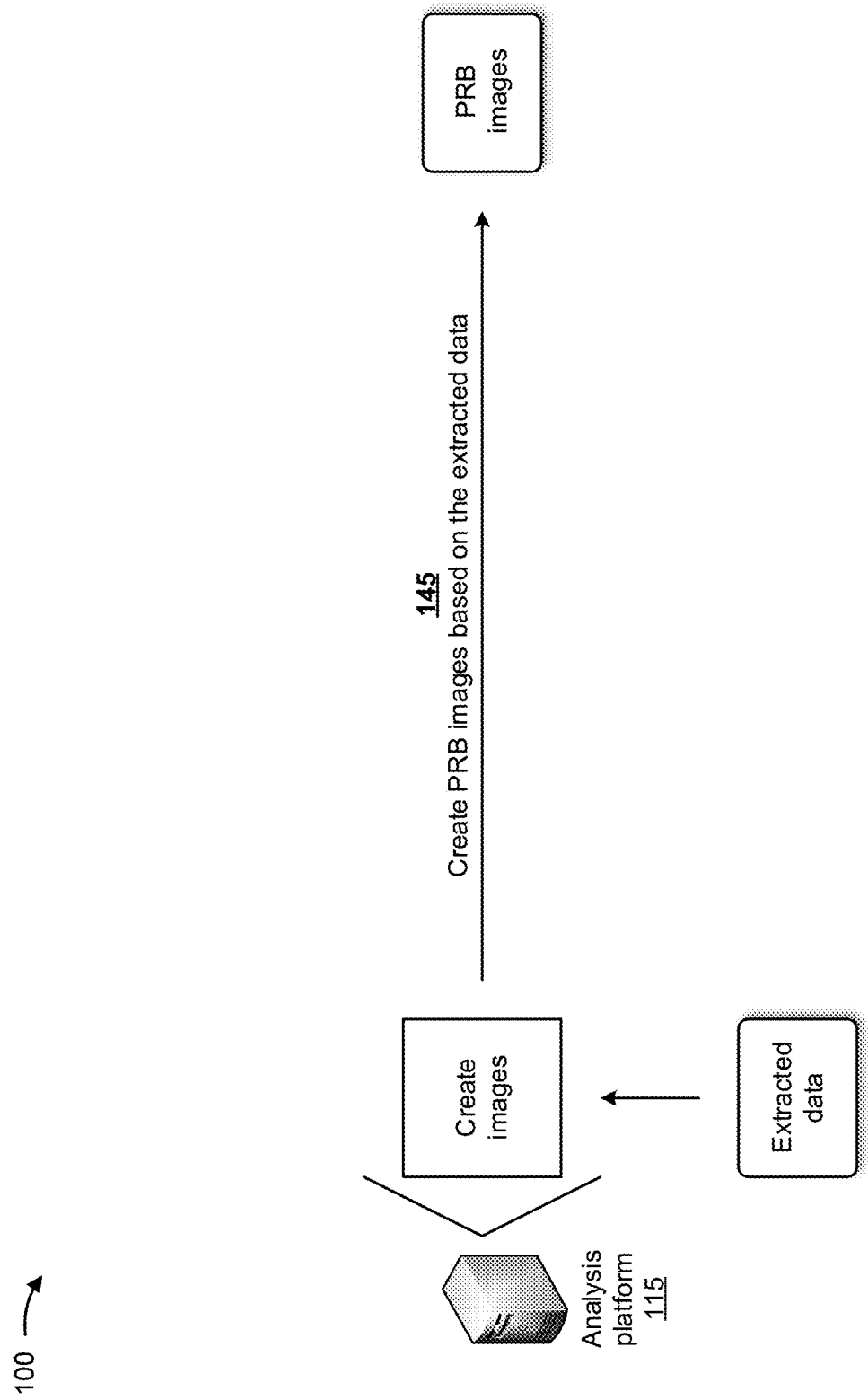

As shown in FIG. 1F, and by reference number 145, analysis platform 115 may create PRB images based on the extracted data. In some implementations, when creating each PRB image based on the extracted data, analysis platform 115 may select data identifying RF branches associated with a carrier from the data identifying the quantity of RF branches. For example, analysis platform 115 may select only data identifying RF branches associated with the carrier by filtering the extracted data (e.g., as provided in the table above) based on an identifier for eNB 110, a sector associated with carrier, and an identifier of the carrier. After selecting the data identifying the RF branches associated with the carrier, analysis platform 115 may select data identifying a bandwidth associated with a bandwidth range of the carrier, from the data identifying the bandwidth. For example, analysis platform 115 may select only bandwidth data within a valid bandwidth range associated with the carrier (e.g., a bandwidth of the carrier is twenty-five PRBs, only the first twenty-five PRB columns may be selected).

After selecting the data identifying the bandwidth associated with the bandwidth range of the carrier, analysis platform 115 may transpose, for each RF branch associated with the carrier, the data identifying the bandwidth associated with the bandwidth range of the carrier so that time is on an x-axis and the bandwidth is on a y-axis. After transposing the data identifying the bandwidth associated with the bandwidth range of the carrier, analysis platform 115 may concatenate, for each RF branch associated with the carrier, the data identifying the RF branches associated with the carrier by adding a horizontal line between the RF branches. Upon transposing the data identifying the bandwidth associated with the bandwidth range of the carrier, the PRB image may be complete.

Figure 1G:
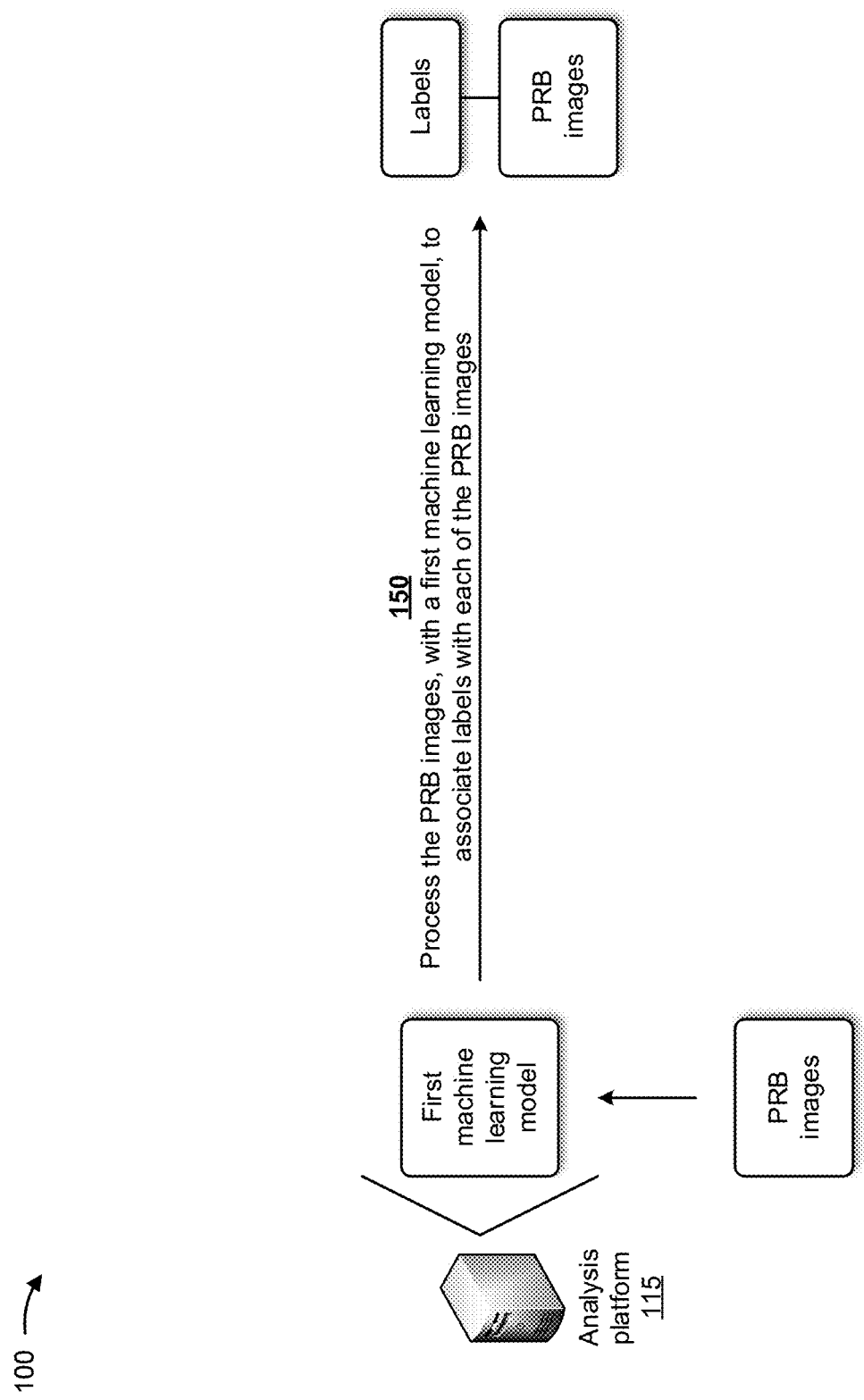

As shown in FIG. 1G, and by reference number 150, analysis platform 115 may process the PRB images, with a first machine learning model, to associate labels with each of the PRB images. In some implementations, analysis platform 115 may train the first machine learning model, with historical data (e.g., historical PRB images, historical labels associated with the historical PRB images, and/or the like) to generate a trained first machine learning model that associates labels with PRB images. In some implementations, the first machine learning model may include an object detection supervised learning model. In some implementations, the PRB images may be processed, before the first machine learning model and with a system (e.g., a computer vision system), to generate images that visibly depict interference. The first machine learning model may process such images to more accurately identify the interference (e.g., due to massive amounts of data associated with such images).

In some implementations, analysis platform 115 may separate the historical data into a training set, a validation set, a test set, and/or the like. The training set may be utilized to train the first machine learning model. The validation set may be utilized to validate results of the trained first machine learning model. The test set may be utilized to test operation of the trained first machine learning model.

In some implementations, analysis platform 115 may train the first machine learning model using, for example, an unsupervised training procedure and based on the historical data. For example, analysis platform 115 may perform dimensionality reduction to reduce the historical data to a minimum feature set, thereby reducing resources (e.g., processing resources, memory resources, and/or the like) to train the first machine learning model, and may apply a classification technique to the minimum feature set.

In some implementations, analysis platform 115 may use a logistic regression classification technique to determine a categorical outcome (e.g., association of particular labels with particular PRB images). Additionally, or alternatively, analysis platform 115 may use a naïve Bayesian classifier technique. In this case, analysis platform 115 may perform binary recursive partitioning to split the historical data into partitions and/or branches, and use the partitions and/or branches to determine outcomes (e.g., association of particular labels with particular PRB images). Based on using recursive partitioning, analysis platform 115 may reduce utilization of computing resources relative to manual, linear sorting and analysis of data points, thereby enabling use of thousands, millions, or billions of data points to train the first machine learning model, which may result in a more accurate first machine learning model than using fewer data points.

Additionally, or alternatively, analysis platform 115 may use a support vector machine (SVM) classifier technique to generate a non-linear boundary between data points in the training set. In this case, the non-linear boundary is used to classify test data into a particular class.

Additionally, or alternatively, analysis platform 115 may train the first machine learning model using a supervised training procedure that includes receiving input to the first machine learning model from a subject matter expert, which may reduce an amount of time, an amount of processing resources, and/or the like to train the first machine learning model relative to an unsupervised training procedure. In some implementations, analysis platform 115 may use one or more other model training techniques, such as a latent semantic indexing technique, and/or the like. For example, analysis platform 115 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model by making the first machine learning model more robust to noisy, imprecise, or incomplete data, and by enabling detection of patterns and/or trends undetectable to human analysts or systems using less complex techniques.

In some implementations, rather than training the first machine learning model, analysis platform 115 may obtain the trained first machine learning model from another system or device that trained the first machine learning model to generate the trained machine learning model. In this case, analysis platform 115 may provide the other system or device with the historical data for use in training the first machine learning model, and may provide the other system or device with updated historical data to retrain the first machine learning model in order to update the trained machine learning model.

In some implementations, with regards to using a supervised training procedure for the first machine learning model, domain experts may label the PRB images, and may identify all potential issues present in each PRB image by drawing rectangles around the issues. In some implementations, the domain experts may utilize a labeling tool to create and associate the labels with the PRB images. The domain experts may be subject to labeling rules that limit the possible labels that may be utilized by the domain experts. For example, the possible labels may include a label for wide band interference, a label for narrow band interference, a label for passive intermodulation, a label for radio failure, and an unsure label (e.g., if the domain experts cannot identify an issue). Wide band interference exceeds a receiver bandwidth of a system and makes data reception as well as interference avoidance difficult or impossible. Narrow band interference contains high levels of radio energy in a frequency range that is smaller than a receiver bandwidth of a system. Passive intermodulation (PIM) occurs in passive devices (e.g., cables, antennas, and/or the like) that are subjected to two or more high power tones. PIM is a result of two or more high power tones mixing at device nonlinearities, such as junctions of dissimilar metals or metal-oxide junctions, loose corroded connectors, and/or the like. Radio failure is the failure of a radio transmitter(s) at eNB 110. One or more data scientists may review the labels generated by the domain experts and may clean and organize the labels. Once the labels are cleaned and organized, the labels may be saved as training data or validation data for the first machine learning model. To ensure that the labels are consistent among the domain experts providing the labels, the domain experts may be provided the same PRB images for labeling, and any inconsistencies may be eliminated via discussions with the domain experts.

As shown in FIG. 1H, and by reference number 155, analysis platform 115 may process the labels and the PRB images, with a region proposal model, to identify potential issues associated with the PRB images. In some implementations, the region proposal model may convert the PRB images into binary numbers based on whether interference associated with the PRB images is benign or poor. PRB images with interference below a particular threshold (e.g., negative one-hundred and ten dBm) may be considered benign, and PRB images with interference above the particular threshold may be considered poor. If $P_{i,j,k}$ indicate a PRB associated with an RF branch (i), a timestamp (j), and a bandwidth (k), then $X_{i,j,k}$ may denote whether the PRB associated with the RF branch (i), the timestamp (j), and the bandwidth (k) is benign or poor, as follows:

$$X_{i,j,k} = \begin{cases} 0 \text{ if } P_{i,j,k} \leq -110 \text{ (benign)} \\ 1 \text{ if } P_{i,j,k} > -110 \text{ (poor)} \end{cases}$$

After converting the PRB images into the binary numbers based on whether interference associated with the PRB images is benign or poor, the region proposal model may compute a percentage of poor PRB images. For example, the region proposal model may compute the percentage ($Y_{i,j}$) of PRB images that are considered poor for each RF branch at each timestamp, as follows:

$$Y_{i,j} = \frac{1}{\text{Bandwidth}} \cdot \sum_{k=1}^{\text{Bandwidth}} X_{i,j,k}$$

After computing the percentage of poor PRB images, the region proposal model may convert the percentage ($Y_{i,j}$) of PRB images that are considered poor into a binary number ($Z_{i,j}$) by applying a configurable threshold $$\left(\text{e.g., } \frac{6.0}{\text{Bandwidth}}\right)$$

in order to determine whether the RF branch (i) at time (j) is considered to be problematic, as follows:

$$Z_{i,j} = \begin{cases} 0 \text{ if } Y_{i,j} \leq \frac{6.0}{\text{Bandwidth}} \text{ (indicating problematic due to not enough bandwidth)} \\ 1 \text{ if } Y_{i,j} > \frac{6.0}{\text{Bandwidth}} \text{ (indicating not problematic due to enough bandwidth)} \end{cases}$$

This may result in generation of a binary array (e.g., a 1×336 binary array) that indicates which parts of each RF branch are considered benign or poor. In this example, the binary array may include three-hundred and thirty-six (336) data points since the binary array includes fourth days of data with each day containing twenty-four hourly data points.

After converting the percentage ($Y_{i,j}$) of PRB images that are considered poor into the binary number ($Z_{i,j}$), the region proposal model may, for each RF branch, identify start and end indices for the potential issues associated with the PRB images. For example, since every RF branch may be represented by the binary array, the region proposal model may identify a location when data points in the binary array transition from zero to one (e.g., indicating a start of a potential issue) and a location when the data points in the binary array transition from one to zero (e.g., indicating an end of the potential issue). As part of this step, the region proposal model may define a first parameter indicating a minimal length associated with the potential issue (e.g., a default value of five may be set for the minimal length). The first parameter may define a duration (e.g., in hours) that the potential issue needs to be present, either consecutively or with a definable minimal separation length, in order to be considered a potential issue. If the potential issue lasts less hours than the first parameter, the region proposal model may ignore the potential issue since short-term issues may not be a priority. The region proposal model may also define a second parameter indicating a separation minimal length associated with the potential issue (e.g., a default value of five may be set for the separation minimal length). The second parameter may define how many hours two potential issues need to be separated in order to be treated as distinct and separate potential issues. If there are less hours than the separation minimal length, separating two potential issues, then the region proposal model may merge the two potential issues into one potential issue.

After identifying the start and end indices for the potential issues associated with the PRB images, the region proposal model may merge start and end indices for the potential issues across RF branches. For example, when there is an overlap between potential issues, the region proposal model may merge the overlapping potential issues by choosing a minimum start index as an overall start index, and a maximum end index as an overall end index.

After merging the start and end indices for the potential issues across RF branches, the region proposal model may organize the identified potential issues in a data structure (e.g., a table). For example, the region proposal model may organize the identified potential issues into a table to indicate the start and end indices of each potential issue in the PRB images, as shown in the follow table.

| eNB Identifier | Sector | Carrier | Start Index | End Index |
|---|---|---|---|---|
| 39 | 1 | 1 | 6 | 24 |
| 588 | 3 | 1 | 198 | 216 |
| 68 | 2 | 1 | 6 | 23 |
| 68 | 2 | 1 | 30 | 47 |
| 3413 | 2 | 1 | 54 | 73 |

In some implementations, analysis platform 115 may train the region proposal model to identify the potential issues associated with the PRB images, as described above. For example, analysis platform 115 may train the region proposal model in a manner similar to the first machine learning model described above in connection with FIG. 1G. In some implementations, rather than training the region proposal model, analysis platform 115 may obtain the region proposal model from another system or device that trained the region proposal model. In this case, analysis platform 115 may provide the other system or device with historical data (e.g., historical PRB images, historical labels associated with the historical PRB images, and/or the like) for use in training the region proposal model, and may provide the other system or device with updated historical data to retrain the region proposal model in order to update the region proposal model.

Figure 1I:
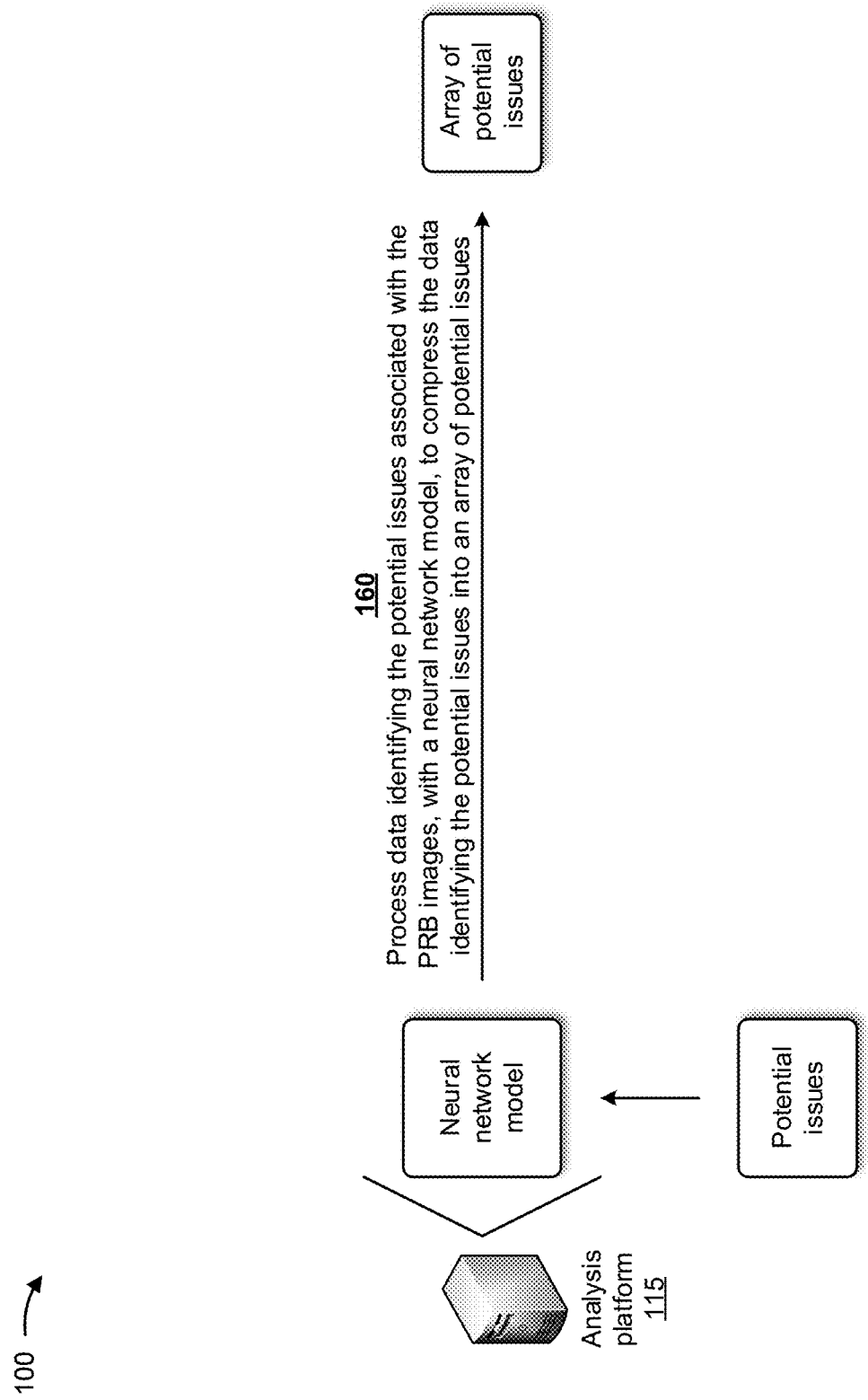

As shown in FIG. 1I, and by reference number 160, analysis platform 115 may process data identifying the potential issues associated with the PRB images, with a neural network model, to compress the data identifying the potential issues into an array of potential issues. In some implementations, the neural network model may include an autoencoder model. An autoencoder model is a neural network model that includes an encoder to compress input information into codes, and a decoder to decipher the codes and generate output information similar to the input information. In other words, an autoencoder model does not require labels because the output information, which is a target of the autoencoder model, is the same as the input information to the model.

The autoencoder model may be an unsupervised learning model or a self-supervised learning model since the autoencoder model requires no labels. The autoencoder model may be utilized for image compression because of this advantage. In some implementations, the autoencoder model may include a convolutional autoencoder model that does not require labels. A convolutional autoencoder model is similar to an autoencoder model, but may process images with convolutional layers. The convolutional autoencoder model may utilize seven layers for the encoder and seven layers for the decoder, and may enable a low pixel-wise cross-entropy loss.

The encoder and the decoder of the convolutional autoencoder model may be trained together to optimize the entire convolutional autoencoder model. In some implementations, since sizes of potential issue images may be different, the convolutional autoencoder model may utilize zero-padding to ensure all potential issue images are of a same size. During inference testing (e.g., to identify interference with potential issues) of the convolutional autoencoder model, only portions of images with potential issues may be extracted and zero-paddings may be utilized to ensure universal dimensioning. Passing a portion of an image with a potential issue through the encoder may generate a reduced-size matrix that represents the original image. The reduced-size matrix may be flattened into a one-dimensional array that represents the original image.

In some implementations, analysis platform 115 may train the neural network model to compress the data identifying the potential issues into the array of potential issues, as described above. For example, analysis platform 115 may train the neural network model in a manner similar to the first machine learning model described above in connection with FIG. 1G. In some implementations, rather than training the neural network model, analysis platform 115 may obtain the neural network model from another system or device that trained the neural network model. In this case, analysis platform 115 may provide the other system or device with historical data (e.g., historical PRB images, historical data identifying potential issues associated with the historical PRB images, historical arrays of potential issues, and/or the like) for use in training the neural network model, and may provide the other system or device with updated historical data to retrain the neural network model in order to update the neural network model.

As shown in FIG. 1J, and by reference number 165, analysis platform 115 may process the array of potential issues, with a second machine learning model, to determine probability scores associated with the potential issues. In some implementations, the second machine learning model may include a boosting machine learning model, such as XGBoost. In boosting machine learning models, trees are built sequentially such that each subsequent tree aims to reduce errors of a previous tree. Each tree learns from predecessor trees and updates residual errors. Hence, a tree that grows next in a sequence may learn from an updated version of the residual errors. In some implementations, the second machine learning model may be trained with outputs from the neural network model that are based on labels assigned by domain experts. During inference, the second machine learning model may be trained with the outputs from the neural network model, but without any human intervention. An output of the second machine learning model may include a probability score of each potential issue. For example, a potential issue may be labeled as passive intermodulation or wide band, and the probability score may be utilized to determine which potential issue is most plausible. In some aspects, a determination of most plausible may be a score greater than a threshold value, a highest score from among a plurality of scores, or the like, configurable in the system.

In some implementations, analysis platform 115 may train the second machine learning model to determine the probability scores associated with the potential issues, as described above. For example, analysis platform 115 may train the second machine learning model in a manner similar to the first machine learning model described above in connection with FIG. 1G. In some implementations, rather than training the second machine learning model, analysis platform 115 may obtain the second machine learning model from another system or device that trained the second machine learning model. In this case, analysis platform 115 may provide the other system or device with historical data (e.g., historical PRB images, historical data identifying potential issues associated with the historical PRB images, historical arrays of potential issues, historical probability scores, and/or the like) for use in training the second machine learning model, and may provide the other system or device with updated historical data to retrain the second machine learning model in order to update the second machine learning model.

Figure 1K:
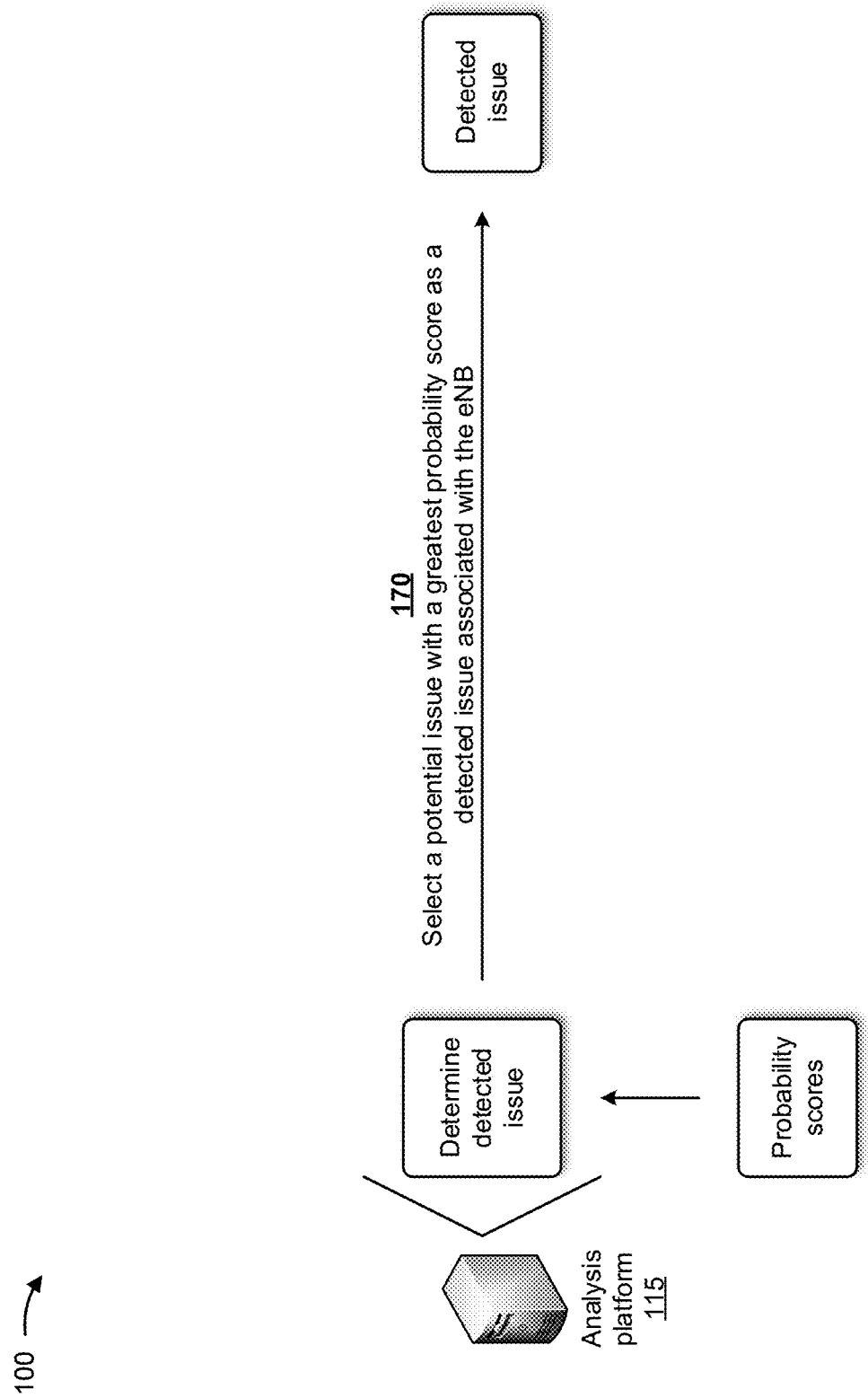

As shown in FIG. 1K, and by reference number 170, analysis platform 115 may select a potential issue with a greatest probability score as a detected issue associated with eNB 110. For example, a potential issued associated with a label with a greatest probability score may be determined to be a detected issue. In some implementations, if a greatest probability score for a potential issue is less than a threshold value (e.g., 0.3), then the potential issue may be labeled as unsure (e.g., to indicate uncertainty associated with the potential issue).

Figure 1L:
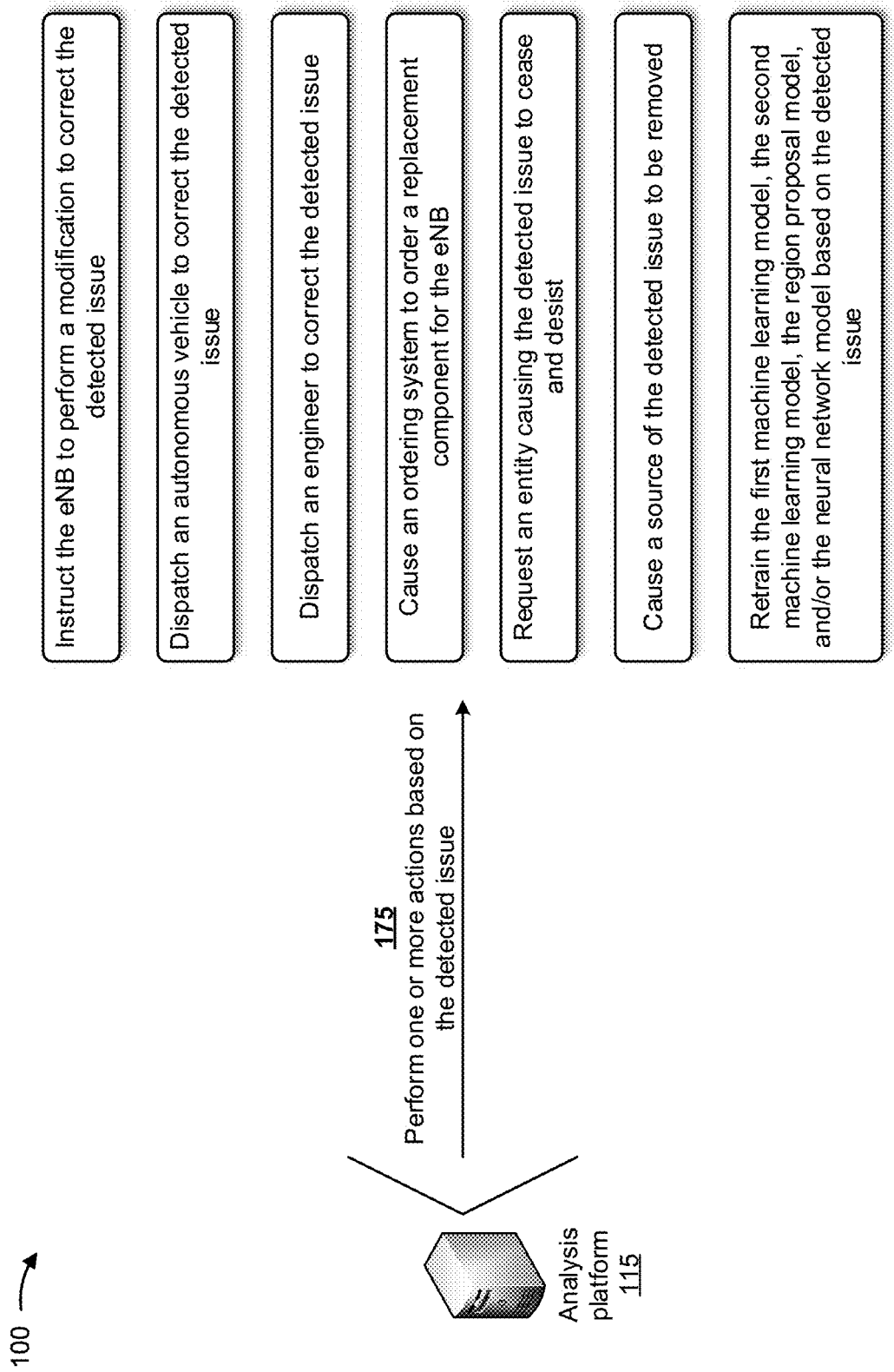

As shown in FIG. 1L, and by reference number 175, analysis platform 115 may perform one or more actions based on the detected issue. In some implementations, the one or more actions may include analysis platform 115 instructing eNB 110 to perform a modification to correct the detected issue. For example, analysis platform 115 may provide, to eNB 110, a signal that instructs eNB 110 to perform the modification (e.g., adjust antennas, increase power, and/or the like) to correct the detected issue. This may conserve resources that would otherwise be wasted having engineers travel to eNB 110 and correct the detected issue, scheduling correction of the detected issue, and/or the like.

In some implementations, the one or more actions may include analysis platform 115 dispatching an autonomous vehicle to correct the detected issue. For example, analysis platform 115 may dispatch a robot, a drone, and/or the like with instructions to correct the detected issue, and the robot, drone, and/or the like may correct the detected issue based on the instructions. This may conserve resources that would otherwise be wasted in correcting any incorrect interpretations of the interference information, traveling to wireless network sites, and/or the like.

In some implementations, the one or more actions may include analysis platform 115 dispatching an engineer to correct the detected issue. For example, analysis platform 115 may provide, to a user device associated with the engineer, a message (e.g., via an email, a text message, a telephone call, and/or the like) identifying the detected issue and including instructions for correcting the detected issue. The engineer may utilize the instructions to correct the detected issue. In this way, analysis platform 115 may conserve resources that would otherwise be wasted in scheduling an engineer to correct the detected issue, waiting for the engineer to correct the detected issue, handling faulty wireless networks until the detected issue is corrected, and/or the like.

In some implementations, the one or more actions may include analysis platform 115 causing an ordering system to order a replacement component for eNB 110. For example, if the detected issue includes an inoperable radio transmitter of eNB 110, analysis platform 115 may automatically order a replacement radio transmitter so that the replacement radio arrives quickly. In this way, analysis platform 115 may conserve resources that would otherwise be wasted in handling the inoperable radio transmitter, waiting for the replacement radio transmitter to arrive, and/or the like.

In some implementations, the one or more actions may include analysis platform 115 requesting an entity causing the detected issue to cease and desist. For example, analysis platform 115 may determine that the detected issue is a local two-way communication system at a construction site that inadvertently causing interference to a signal generated by eNB 110, and may provide, to an owner of the local two-way communication system, a message instructing the owner to cease and desist from causing interference to the signal of eNB 110. In this way, analysis platform 115 may conserve resources that would otherwise be wasted in waiting for the two-way communication system to cease causing the interference, handling faulty wireless networks until the two-way communication system ceases causing the interference, and/or the like.

In some implementations, the one or more actions may include analysis platform 115 causing a source of the detected issue to be removed. For example, analysis platform 115 may determine that the source of the detected issue is a broken antenna bracket causing an antenna of eNB 110 to lean severely forward causing reduced coverage. Analysis platform 115 may cause a technician or a crew of technicians to be dispatched to repair the broken antenna bracket. In this way, analysis platform 115 may conserve resources that would otherwise be wasted in waiting for the antenna bracket to be repaired, handling faulty wireless networks until the antenna bracket is repaired, and/or the like.

In some implementations, the one or more actions may include analysis platform 115 retraining the first machine learning model, the second machine learning model, the region proposal model, and/or the neural network model based on the detected issue. In this way, analysis platform 115 may improve the accuracy of the first machine learning model, the second machine learning model, the region proposal model, and/or the neural network model in identifying the detected issue, which may improve speed and efficiency of the first machine learning model, the second machine learning model, the region proposal model, and/or the neural network model and conserve computing resources, networking resources, and/or the like.

Although implementations are described herein in connection with a 4G LTE wireless network, the implementations may be utilized with any wireless network, such as a 5G wireless network, a WiFi network, a wireless network that groups physical uplink resources into smaller elements and measures interference on a per radio port/RF branch and per PRB level, and/or the like.

In this way, several different stages of the process for identifying issues in wireless networks are automated via machine learning and neural network models, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning and neural network models to identify issues in wireless networks in the manner described herein. Finally, the process for utilizing machine learning and neural network models to identify issues in wireless networks conserves computing resources, networking resources, transportation resources, and/or the like that would otherwise be wasted in retrieving the interference information, manipulating the interference information, analyzing the interference information, correcting any incorrect interpretations of the interference information, traveling to wireless network sites, and/or the like.

Furthermore, implementations described herein may enable objective and consistent identification of interference issues, which may help engineers to draw more accurate and timely conclusions when reviewing the interference issues. Implementations described herein may enable autonomous detection and potential resolution of interference issues in wireless networks, and may enable inspection of every single image every day to detect more interference issues and resolve some remotely and autonomously.

As indicated above, FIGS. 1A-1L are provided merely as examples. Other examples may differ from what was described with regard to FIGS. 1A-1L. The number and arrangement of devices and networks shown in FIGS. 1A-1L are provided as an example. In practice, there may be additional devices and/or networks, fewer devices and/or networks, different devices and/or networks, or differently arranged devices and/or networks than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) of FIGS. 1A-1L may perform one or more functions described as being performed by another set of devices of FIGS. 1A-1L.

Figure 2:
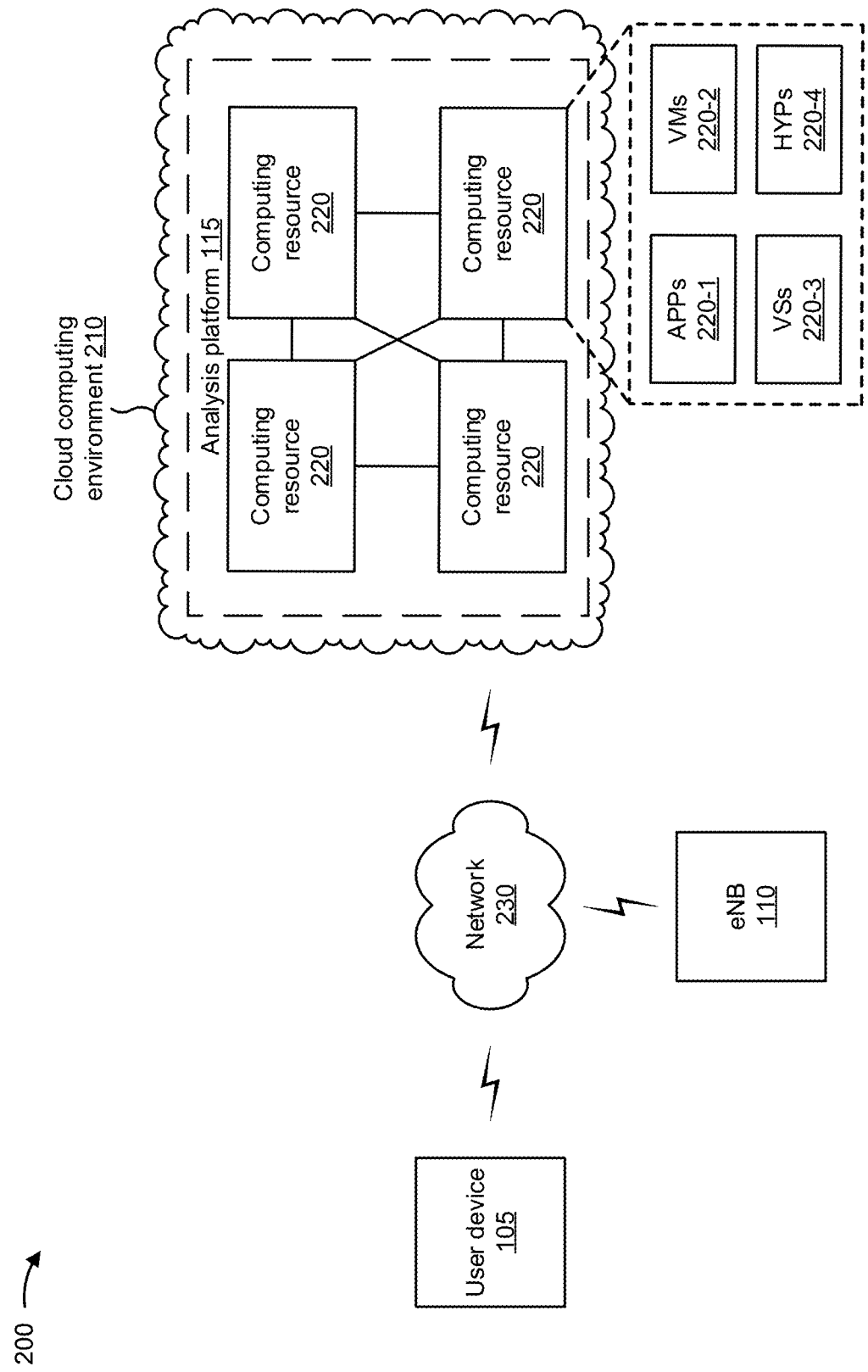
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, eNB 110, analysis platform 115, and a network 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to eNB 110 and/or analysis platform 115.

eNB 110 includes one or more devices capable of receiving, generating, storing, processing, and/or providing information, as described herein. In some implementations, eNB 110 may be associated with a 4G LTE network. In some implementations, eNB 110 may be replaced with a gNodeB (gNB) associated with a 5G/NR network, a base station associated with another type of RAN, a small cell base station, such as a base station of a microcell, a picocell, and/or a femtocell, and/or the like. In some implementations, eNB 110 may communicate with and provide wireless access to one or more user devices 105. In some implementations, eNB 110 may receive information from and/or transmit information to user device 105 and/or analysis platform 115.

Analysis platform 115 includes one or more devices that utilize machine learning and neural network models to identify issues in wireless networks. In some implementations, analysis platform 115 may be designed to be modular such that certain software components may be swapped in or out depending on a particular need. As such, analysis platform 115 may be easily and/or quickly reconfigured for different uses. In some implementations, analysis platform 115 may receive information from and/or transmit information to one or more user devices 105 and/or eNB 110.

In some implementations, as shown, analysis platform 115 may be hosted in a cloud computing environment 210. Notably, while implementations described herein describe analysis platform 115 as being hosted in cloud computing environment 210, in some implementations, analysis platform 115 may not be cloud-based (i.e., may be implemented outside of a cloud computing environment) or may be partially cloud-based.

Cloud computing environment 210 includes an environment that hosts analysis platform 115. Cloud computing environment 210 may provide computation, software, data access, storage, etc., services that do not require end-user knowledge of a physical location and configuration of system(s) and/or device(s) that host analysis platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices.

In some implementations, computing resource 220 may host analysis platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with analysis platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of analysis platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 230 may receive information from and/or transmit information to user device 105 and/or analysis platform 115.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
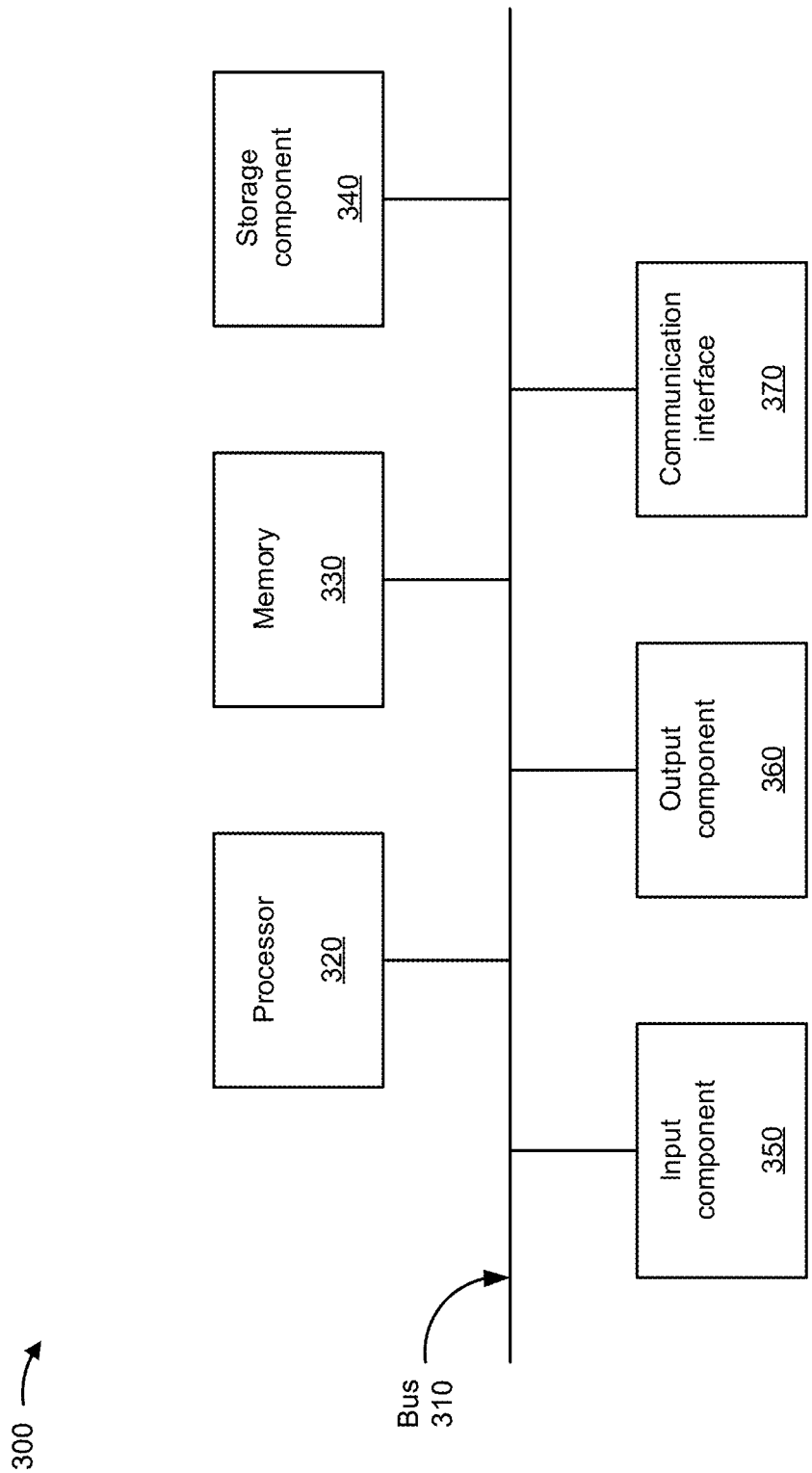
FIG. 3 is a diagram of example components of one or more devices of FIG. 2.

FIG. 3 is a diagram of example components of a device 300. Device 300 may correspond to user device 105, eNB 110, analysis platform 115, and/or computing resource 220. In some implementations, user device 105, eNB 110, analysis platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
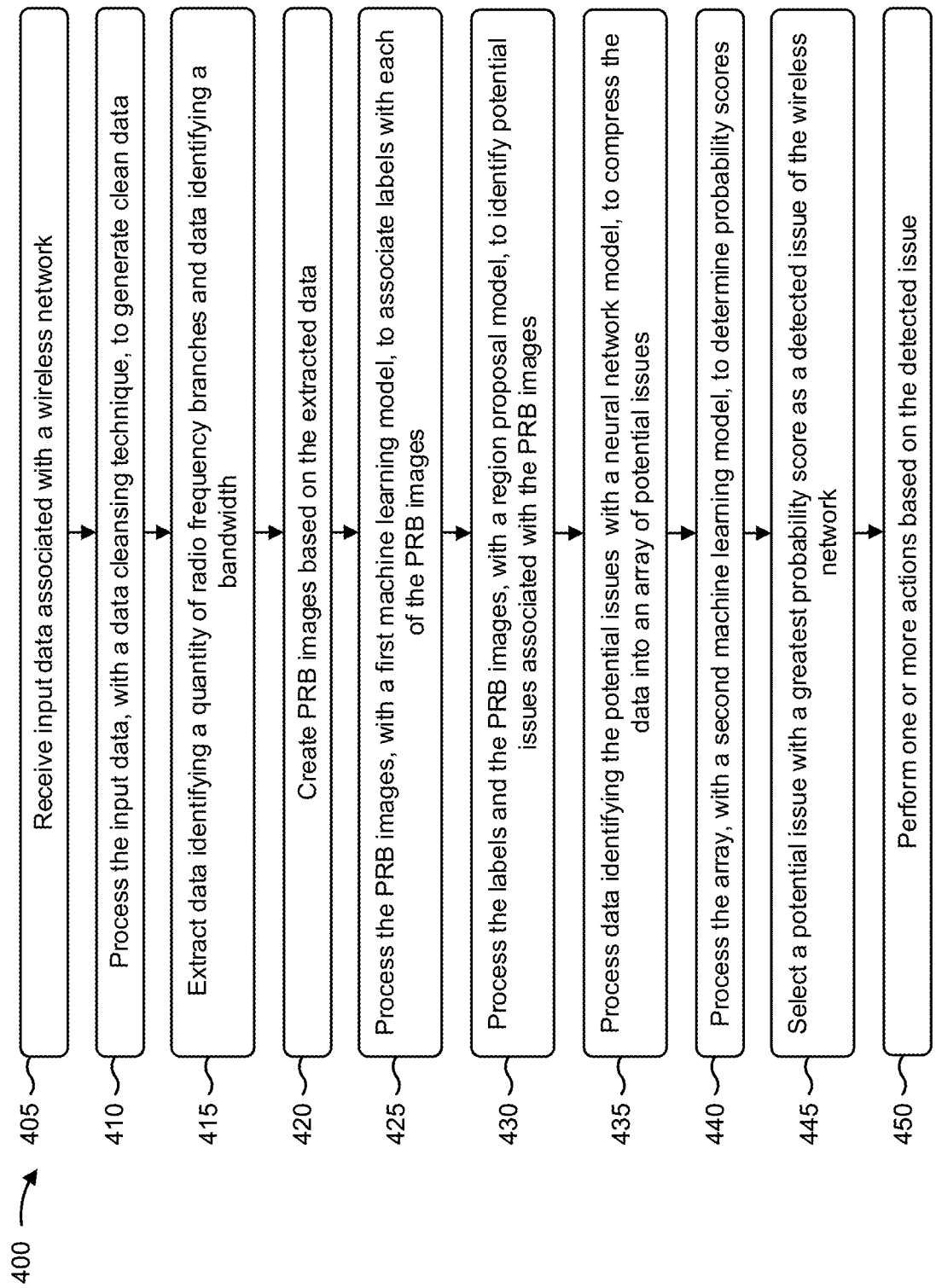
FIG. 4 is a flow chart of an example process for utilizing machine learning and neural network models to identify issues in wireless networks.

FIG. 4 is a flow chart of an example process 400 for utilizing machine learning and neural network models to identify issues in wireless networks. In some implementations, one or more process blocks of FIG. 4 may be performed by a device (e.g., analysis platform 115). In some implementations, one or more process blocks of FIG. 4 may be performed by another device or a group of devices separate from or including the device, such as a user device (e.g., user device 105) and/or an eNB (e.g., eNB 110).

As shown in FIG. 4, process 400 may include receiving input data that includes time and date data, branch identification data, and interference per physical resource block number data associated with a wireless network (block 405). For example, the device (e.g., using computing resource 220, processor 320, communication interface 370, and/or the like) may receive input data that includes time and date data, branch identification data, and interference per physical resource block number data associated with a wireless network, as described above. The time and date data may include data identifying numeric hours and numeric dates associated with branch identification data. The branch identification data may include data identifying network devices and radio frequency branches of the wireless network. The interference per physical resource block number data may include data identifying measured, average radio frequency interference at a radio port of the wireless network.

As further shown in FIG. 4, process 400 may include processing the input data, with a data cleansing technique, to generate clean data (block 410). For example, the device (e.g., using computing resource 220, processor 320, memory 330, and/or the like) may process the input data, with a data cleansing technique, to generate clean data, as described above. In some implementations, processing the input data, with the data cleansing technique, to generate the clean data may include removing duplicate data from the input data, converting incorrectly formatted data of the input data into correctly formatted data, and combining time data and date data of the time and date data.

As further shown in FIG. 4, process 400 may include extracting data from the clean data to generate extracted data identifying a quantity of radio frequency branches and data identifying a bandwidth (block 415). For example, the device (e.g., using computing resource 220, processor 320, storage component 340, and/or the like) may extract data from the clean data to generate extracted data identifying a quantity of radio frequency branches and data identifying a bandwidth, as described above.

As further shown in FIG. 4, process 400 may include creating physical resource block images based on the extracted data (block 420). For example, the device (e.g., using computing resource 220, processor 320, memory 330, storage component 340, and/or the like) may create physical resource block images based on the extracted data, as described above. In some implementations, creating the physical resource block images based on the extracted data may include selecting, for each physical resource block image, data identifying radio frequency branches associated with a carrier, from the data identifying the quantity of radio frequency branches; selecting, for each physical resource block image, data identifying a bandwidth associated with a bandwidth range of the carrier, from the data identifying the bandwidth; transposing, for each radio frequency branch associated with the carrier, the data identifying the bandwidth associated with the bandwidth range of the carrier so that time is on an x-axis and the bandwidth is on a y-axis; and concatenating, for each radio frequency branch associated with the carrier, the data identifying the radio frequency branches associated with the carrier by adding a horizontal line between the radio frequency branches.

As further shown in FIG. 4, process 400 may include processing the physical resource block images, with a first machine learning model, to associate labels with each of the physical resource block images (block 425). For example, the device (e.g., using computing resource 220, processor 320, memory 330, and/or the like) may process the physical resource block images, with a first machine learning model, to associate labels with each of the physical resource block images, as described above. In some implementations, processing the physical resource block images, with the first machine learning model, to associate the labels with each of the physical resource block images may include comparing portions of the physical resource block images with issue images identified as containing issues; determining that a set of the issue images potentially match the portions of the physical resource block images based on comparing the portions of the physical resource block images with the issue images; and associating the labels with each of the physical resource block images based on determining that the set of the issue images potentially match the portions of the physical resource block images.

As further shown in FIG. 4, process 400 may include processing the labels and the physical resource block images, with a region proposal model, to identify potential issues associated with the physical resource block images (block 430). For example, the device (e.g., using computing resource 220, processor 320, storage component 340, and/or the like) may process the labels and the physical resource block images, with a region proposal model, to identify potential issues associated with the physical resource block images, as described above. In some implementations, processing the labels and the physical resource block images, with the region proposal model, to identify the potential issues may include converting the physical resource block images into binary data; comparing the binary data to an interference threshold associated with identifying the potential issues; identifying sets of the physical resource block images that are associated with sets of the binary data that fail to satisfy the interference threshold; computing percentages based on the sets of the physical resource block images as compared to the physical resource block images; converting the percentages into binary arrays; determine start and end indices for the binary arrays; and merging the start and end indices with the binary arrays to generate the data identifying the potential issues associated with the physical resource block images.

As further shown in FIG. 4, process 400 may include processing data identifying the potential issues associated with the physical resource block images, with a neural network model, to compress the data identifying the potential issues into an array of potential issues (block 435). For example, the device (e.g., using computing resource 220, processor 320, memory 330, storage component 340, and/or the like) may process data identifying the potential issues associated with the physical resource block images, with a neural network model, to compress the data identifying the potential issues into an array of potential issues, as described above. In some implementations, processing the data identifying the potential issues associated with the physical resource block images, with the neural network model, to compress the data identifying the potential issues into the array of potential issues may include extracting portions of the data identifying the potential issues associated only with the potential issues; generating a reduced size matrix of potential issues based on the portions of the data identifying the potential issues; and flattening the reduced size matrix of potential issues into the array of potential issues.

As further shown in FIG. 4, process 400 may include processing the array of potential issues, with a second machine learning model, to determine probability scores associated with the potential issues (block 440). For example, the device (e.g., using computing resource 220, processor 320, memory 330, and/or the like) may process the array of potential issues, with a second machine learning model, to determine probability scores associated with the potential issues, as described above. In some implementations, processing the array of potential issues, with the second machine learning model, to determine the probability scores associated with the potential issues may include determining that a particular probability score associated with a particular potential issue fails to satisfy a threshold score, and labeling the particular potential issue as undetermined based on the particular probability score failing to satisfy the threshold score.

As further shown in FIG. 4, process 400 may include selecting a potential issue with a greatest probability score as a detected issue associated with the wireless network (block 445). For example, the device (e.g., using computing resource 220, processor 320, storage component 340, and/or the like) may select a potential issue with a greatest probability score as a detected issue associated with the wireless network, as described above.

As further shown in FIG. 4, process 400 may include performing one or more actions based on the detected issue (block 450). For example, the device (e.g., using computing resource 220, processor 320, memory 330, storage component 340, communication interface 370, and/or the like) may perform one or more actions based on the detected issue, as described above. In some implementations, performing the one or more actions may include instructing a network device of the wireless network to perform a modification to correct the detected issue; dispatching an autonomous vehicle to correct the detected issue; dispatching an engineer to correct the detected issue; causing an ordering system to order a replacement component for the wireless network; requesting an entity causing the detected issue to cease and desist; causing a source of the detected issue to be removed; retraining one or more of the first machine learning model, the second machine learning model, the region proposal model, or the neural network model based on the detected issue; providing, for display, information identifying the detected issue; and/or the like.

Process 400 may include additional implementations, such as any single implementation or any combination of implementations described below and/or in connection with one or more other processes described elsewhere herein.

In some implementations, process 400 may include filtering the input data to reduce a quantity of data of the input data prior to processing the input data with the data cleansing technique.

In some implementations, process 400 may include dividing the input data into batches of input data prior to processing the input data with the data cleansing technique, storing the batches of input data in a data structure, and processing each of the batches of input data from the data structure, individually and with the data cleansing technique, to generate the clean data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   extracting, by a device, data from input data to generate extracted data identifying a quantity of radio frequency branches and data identifying a bandwidth,
      wherein the data includes time and date data, branch identification data, and interference per physical resource block number data associated with a wireless network;
   creating, by the device, physical resource block images based on the extracted data;
   processing, by the device, the physical resource block images to associate labels with each of the physical resource block images and to identify potential issues associated with the physical resource block images;
   processing, by the device, data identifying the potential issues, with a machine learning model, to determine probability scores associated with the potential issues; and
   performing, by the device, one or more actions based on a potential issue, of the potential issues, that has a greatest probability score, of the probability scores.

2. The method of claim 1, further comprising:
   receiving the input data; and
   filtering the input data to reduce a quantity of data of the input data.

3. The method of claim 2, further comprising:
   removing duplicate data from the input data;
   converting incorrectly formatted data of the input data into correctly formatted data; and
   combining time data and date data of the time and date data.

4. The method of claim 1, wherein:
   the time and date data includes data identifying numeric hours and numeric dates associated with branch identification data;
   the branch identification data includes data identifying network devices and radio frequency branches of the wireless network; and
   the interference per physical resource block number data includes data identifying measured, average radio frequency interference at a radio port of the wireless network.

5. The method of claim 1, wherein creating the physical resource block images based on the extracted data comprises:
   selecting, for each physical resource block image, data identifying radio frequency branches associated with a carrier, from the data identifying the quantity of radio frequency branches;
   selecting, for each physical resource block image, data identifying a bandwidth associated with a bandwidth range of the carrier, from the data identifying the bandwidth;
   transposing, for each radio frequency branch associated with the carrier, the data identifying the bandwidth associated with the bandwidth range of the carrier so that time is on an x-axis and the bandwidth is on a y-axis; and
   concatenating, for each radio frequency branch associated with the carrier, the data identifying the radio frequency branches associated with the carrier by adding a horizontal line between the radio frequency branches.

6. The method of claim 1, wherein processing the physical resource block images comprises:
   comparing portions of the physical resource block images with issue images identified as containing issues;
   determining that a set of the issue images potentially match the portions of the physical resource block images based on comparing the portions of the physical resource block images with the issue images,
      wherein the set of the issue images are associated with the labels; and
   associating the labels with each of the physical resource block images based on determining that the set of the issue images potentially match the portions of the physical resource block images.

7. The method of claim 1, wherein the method further comprises:
   extracting portions of the data identifying the potential issues associated only with the potential issues;
   generating a reduced size matrix of potential issues based on the portions of the data identifying the potential issues; and
   flattening the reduced size matrix of potential issues into an array of potential issues; and
   wherein processing the data identifying the potential issues comprises:
   processing the array of potential issues.

8. A device, comprising:
   one or more memories; and
   one or more processors, communicatively coupled to the one or more memories, configured to:

receive input data that includes time and date data, branch identification data, and interference per physical resource block number data associated with a wireless network;

extract data from the input data to generate extracted data identifying a quantity of radio frequency branches and data identifying a bandwidth;

create physical resource block images based on the extracted data;

process the physical resource block images to associate labels with each of the physical resource block images and to identify potential issues associated with the physical resource block images;

process data identifying the potential issues, with a machine learning model, to determine probability scores associated with the potential issues; and perform one or more actions based on a detected issue, of the potential issues, that has a greatest probability score, of the probability scores.

9. The device of claim 8, wherein the one or more processors, when processing the physical resource block images, are configured to:

convert the physical resource block images into binary data;

compare the binary data to an interference threshold associated with identifying the potential issues;

identify sets of the physical resource block images that are associated with sets of the binary data that fail to satisfy the interference threshold;

compute percentages based on the sets of the physical resource block images as compared to the physical resource block images;

convert the percentages into binary arrays;

determine start and end indices for the binary arrays; and merge the start and end indices with the binary arrays to generate the data identifying the potential issues associated with the physical resource block images, wherein the potential issues include one or more of:
narrow band interference,
wide band interference,
passive intermodulation, or
radio failure.

10. The device of claim 8, wherein the one or more processors are further configured to:

divide the input data into batches of input data;

store the batches of input data in a data structure; and process the batches of input data with a data cleansing technique to generate clean data; and wherein the one or more processors, when extracting the data from the input data; are configured to extract the data from the clean data.

11. The device of claim 8, wherein the one or more processors, when processing the data identifying the potential issues, are configured to:

determine that a particular probability score associated with a particular potential issue fails to satisfy a threshold score; and label the particular potential issue as undetermined based on the particular probability score failing to satisfy the threshold score.

12. The device of claim 8, wherein the one or more processors, when performing the one or more actions, are configured to one or more of:

instruct a network device of the wireless network to perform a modification to correct the detected issue;

dispatch an autonomous vehicle to correct the detected issue; or dispatch an engineer to correct the detected issue.

13. The device of claim 8, wherein the one or more processors, when performing the one or more actions, are configured to one or more of:

cause an ordering system to order a replacement component for the wireless network;

request an entity causing the detected issue to cease and desist; or cause a source of the detected issue to be removed.

14. The device of claim 8, wherein the one or more processors, when performing the one or more actions, are configured to one or more of:

retrain the machine learning model based on the detected issue; or provide, for display, information identifying the detected issue.

15. A non-transitory computer-readable medium storing instructions, the instructions comprising:

one or more instructions that, when executed by one or more processors, cause the one or more processors to:

receive input data that includes time and date data, branch identification data, and interference per physical resource block number data associated with a wireless network;

extract data from the input data to generate extracted data identifying a quantity of radio frequency branches and data identifying a bandwidth;

create physical resource block images based on the extracted data;

process the physical resource block images to associate labels with each of the physical resource block images and to identify potential issues associated with the physical resource block images;

process data identifying the potential issues, with a machine learning model, to determine probability scores associated with the potential issues;

select a potential issue with a greatest probability score as a detected issue associated with the wireless network; and perform one or more actions based on the detected issue.

16. The non-transitory computer-readable medium of claim 15, wherein the one or more instructions, that cause the one or more processors to create the physical resource block images based on the extracted data, cause the one or more processors to:

select, for each physical resource block image, data identifying radio frequency branches associated with a carrier, from the data identifying the quantity of radio frequency branches;

select, for each physical resource block image, data identifying a bandwidth associated with a bandwidth range of the carrier, from the data identifying the bandwidth;

transpose, for each radio frequency branch associated with the carrier, the data identifying the bandwidth associated with the bandwidth range of the carrier so that time is on an x-axis and the bandwidth is on a y-axis; and concatenate, for each radio frequency branch associated with the carrier, the data identifying the radio frequency branches associated with the carrier by adding a horizontal line between the radio frequency branches.

17. The non-transitory computer-readable medium of claim 15, wherein the one or more instructions, that cause the one or more processors to process the physical resource block images, cause the one or more processors to:

compare portions of the physical resource block images with issue images identified as containing issues;

determine that a set of the issue images potentially match the portions of the physical resource block images based on comparing the portions of the physical resource block images with the issue images,
wherein the set of the issue images are associated with the labels; and associate the labels with each of the physical resource block images based on determining that the set of the issue images potentially match the portions of the physical resource block images.

18. The non-transitory computer-readable medium of claim 15, wherein the one or more instructions, that cause the one or more processors to process the physical resource block images, cause the one or more processors to:

convert the physical resource block images into binary data;

compare the binary data to an interference threshold associated with identifying the potential issues;

identify sets of the physical resource block images that are associated with sets of the binary data that fail to satisfy the interference threshold;

compute percentages based on the sets of the physical resource block images as compared to the physical resource block images;

convert the percentages into binary arrays;

determine start and end indices for the binary arrays; and merge the start and end indices with the binary arrays to generate the data identifying the potential issues associated with the physical resource block images.

19. The non-transitory computer-readable medium of claim 15, wherein the one or more instructions further cause the one or more processors to:

extract portions of the data identifying the potential issues associated only with the potential issues;

generate a reduced size matrix of potential issues based on the portions of the data identifying the potential issues; and flatten the reduced size matrix of potential issues into an array of potential issues; and wherein the one or more instructions, that cause the one or more processors to process the data identifying the potential issues, cause the one or more processors to: process the array of potential issues.

20. The non-transitory computer-readable medium of claim 15, wherein the one or more instructions, that cause the one or more processors to perform the one or more actions, cause the one or more processors to one or more of:

instruct a network device of the wireless network to perform a modification to correct the detected issue;

dispatch an autonomous vehicle to correct the detected issue;

dispatch an engineer to correct the detected issue;

cause an ordering system to order a replacement component for the wireless network;

request an entity causing the detected issue to cease and desist;

cause a source of the detected issue to be removed; or retrain the machine learning model based on the detected issue.

* * * * *